US008371069B2

(12) United States Patent
O'Sullivan et al.

(10) Patent No.: US 8,371,069 B2
(45) Date of Patent: Feb. 12, 2013

(54) FASTENING STRIP FOR USE WITH A SEAL FOR SEALING A WINDOW

(75) Inventors: Tony O'Sullivan, Mullingar (IE); Tom Hyland, Mullingar (IE)

(73) Assignee: Rainforest R&D Limited, Mullingar, County Westmeath (IE)

( * ) Notice: Subject to any disclaimer, the term of this patent is extended or adjusted under 35 U.S.C. 154(b) by 644 days.

(21) Appl. No.: 12/522,789

(22) PCT Filed: Jan. 10, 2008

(86) PCT No.: PCT/EP2008/050238
§ 371 (c)(1),
(2), (4) Date: Aug. 31, 2009

(87) PCT Pub. No.: WO2008/084076

PCT Pub. Date: Jul. 17, 2008

(65) Prior Publication Data
US 2010/0011670 A1 Jan. 21, 2010

(30) Foreign Application Priority Data
Jan. 12, 2007 (EP) .................................. 07100504

(51) Int. Cl.
*E06B 7/16* (2006.01)
(52) U.S. Cl. .................. 49/492.1; 49/482.1; 49/493.1
(58) Field of Classification Search ............... 49/492.1, 49/493.1, 482.1, 490.1
See application file for complete search history.

(56) References Cited

U.S. PATENT DOCUMENTS

| | | | | | |
|---|---|---|---|---|---|
| 3,029,481 | A | * | 4/1962 | Henniges | 49/482.1 |
| 3,077,251 | A | * | 2/1963 | Fraylick et al. | 52/716.7 |
| 3,110,068 | A | * | 11/1963 | Perrochat | 24/297 |
| 3,139,784 | A | * | 7/1964 | Moorman | 411/510 |
| 3,167,824 | A | * | 2/1965 | Berwanger | 49/482.1 |
| 3,634,991 | A | * | 1/1972 | Barton et al. | 52/716.7 |
| 3,720,030 | A | * | 3/1973 | Krodel | 52/204.597 |
| 3,968,613 | A | | 7/1976 | Meyer | 52/400 |
| 4,270,328 | A | | 6/1981 | Page | 52/511 |
| 4,436,337 | A | * | 3/1984 | Bowes et al. | 296/201 |
| 4,438,609 | A | * | 3/1984 | Nielson et al. | 52/208 |
| 4,728,146 | A | | 3/1988 | Srdinko | 296/216 |
| 4,850,640 | A | * | 7/1989 | Gold | 296/201 |

(Continued)

FOREIGN PATENT DOCUMENTS

| EP | 0 193 011 | 9/1986 |
|---|---|---|
| GB | 941057 | 11/1963 |

(Continued)

OTHER PUBLICATIONS

International Search Report for International Application No. PCT/EP2008/050238, Apr. 17, 2008.

(Continued)

*Primary Examiner* — Katherine W Mitchell
*Assistant Examiner* — Justin Rephann
(74) *Attorney, Agent, or Firm* — Kusner & Jaffe

(57) ABSTRACT

A fastening strip (10, 30) and seal (40) arrangement are described. By use of a plurality of individual retention elements (20) that are coupled—either integrally or separate—to the fastening strip it is possible to effect inter-engagement of the seal and strip. The retention elements are received into the seal, which is deformable and engages with the retention elements to effect the retention of the fastening strip to the seal.

26 Claims, 29 Drawing Sheets

U.S. PATENT DOCUMENTS

| | | | | |
|---|---|---|---|---|
| 5,205,075 | A * | 4/1993 | Moyer | 49/493.1 |
| 5,300,346 | A * | 4/1994 | Tamura et al. | 428/156 |
| 5,343,662 | A * | 9/1994 | Nelson | 52/208 |
| 5,376,423 | A * | 12/1994 | Wiegand | 428/99 |
| 5,395,126 | A * | 3/1995 | Tresslar | 277/637 |
| 5,433,038 | A * | 7/1995 | Dupuy | 49/377 |
| 5,460,424 | A * | 10/1995 | Wagner | 296/146.14 |
| 5,519,968 | A * | 5/1996 | Dupuy | 49/489.1 |
| 5,607,198 | A * | 3/1997 | Wirsing | 296/146.16 |
| 5,702,148 | A * | 12/1997 | Vaughan et al. | 296/146.9 |
| 5,743,047 | A | 4/1998 | Bonne | 49/490.1 |
| 5,799,442 | A * | 9/1998 | Takahashi et al. | 49/377 |
| 5,870,860 | A * | 2/1999 | Heller | 49/477.1 |
| 6,030,020 | A | 2/2000 | Malm | 296/93 |
| 6,152,523 | A * | 11/2000 | Schonebeck | 296/216.09 |
| 6,409,251 | B1 * | 6/2002 | Kaye et al. | 296/146.9 |
| 6,546,683 | B1 * | 4/2003 | Senge | 52/208 |
| 6,612,074 | B1 * | 9/2003 | Kaye et al. | 49/441 |
| 6,679,003 | B2 * | 1/2004 | Nozaki et al. | 49/441 |
| 6,681,526 | B2 * | 1/2004 | Mueller et al. | 49/440 |
| 6,820,372 | B2 * | 11/2004 | Nozaki | 49/498.1 |
| 7,010,886 | B2 * | 3/2006 | Deguchi et al. | 49/479.1 |
| 7,052,021 | B2 * | 5/2006 | Plottnik | 277/642 |
| 7,055,291 | B2 * | 6/2006 | Nakanishi et al. | 52/716.5 |
| 7,118,169 | B2 * | 10/2006 | Hara et al. | 296/208 |
| 7,478,863 | B2 * | 1/2009 | Krause | 296/146.2 |
| 2002/0184828 | A1 * | 12/2002 | Park et al. | 49/489.1 |
| 2007/0101656 | A1 * | 5/2007 | Stipp | 49/490.1 |
| 2007/0163182 | A1 * | 7/2007 | Morihara | 49/492.1 |
| 2008/0302022 | A1 * | 12/2008 | Knight et al. | 49/490.1 |

FOREIGN PATENT DOCUMENTS

| | | |
|---|---|---|
| JP | 04-238728 | 8/1992 |
| JP | 09-240283 | 9/1997 |
| JP | 2003-146086 | 5/2003 |
| WO | WO 02/072372 | 9/2002 |
| WO | WO 2004037576 A2 * | 5/2004 |

OTHER PUBLICATIONS

Office Action for corresponding Chinese Patent Application No. 200880006521.0, dated Apr. 6, 2012 (including English translation).

* cited by examiner

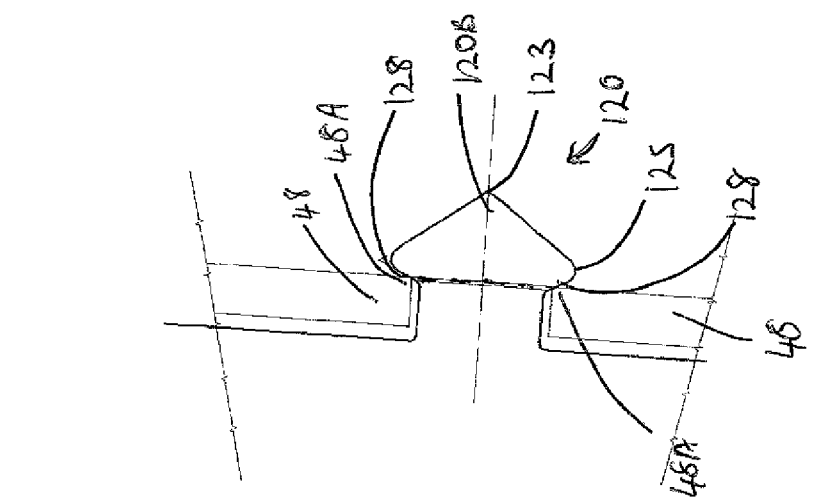
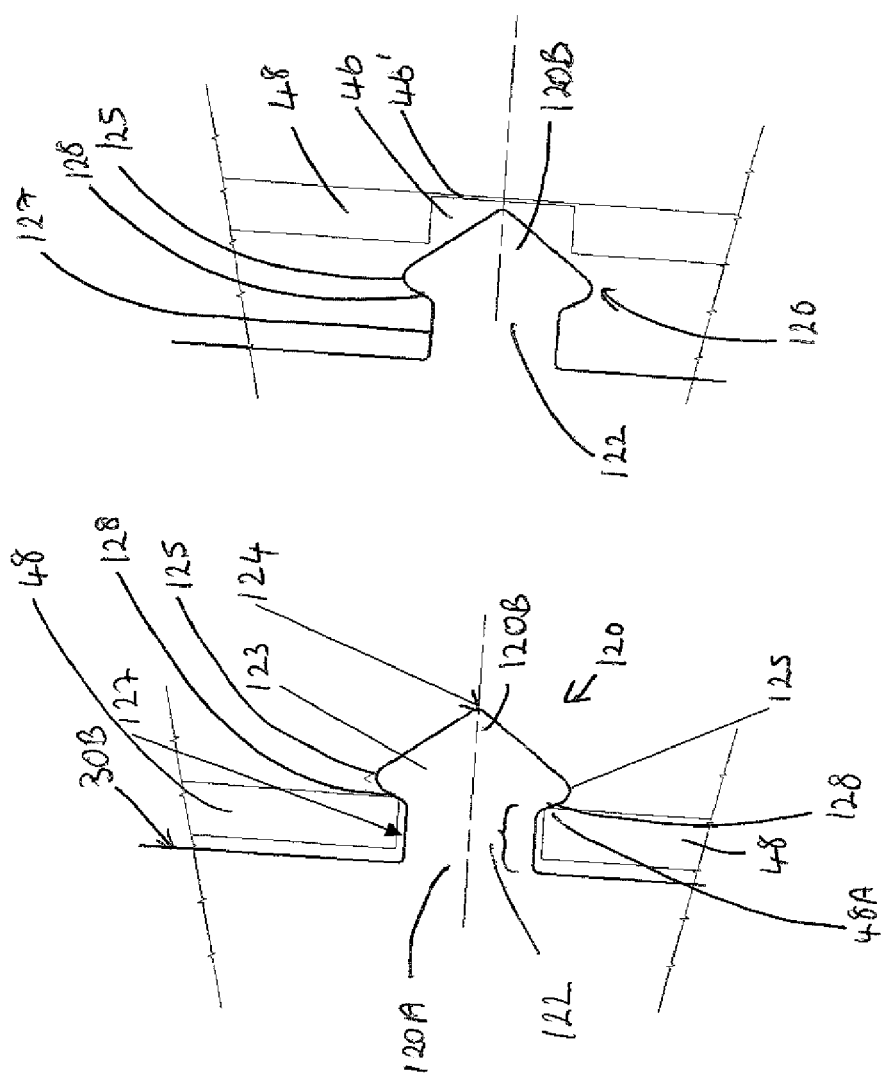
FIG. 5C
FIG. 5B
FIG. 5A

Detail 'B'

FASTENING STRIP FOR USE WITH A SEAL FOR SEALING A WINDOW

FIELD OF THE INVENTION

The present invention relates to vehicle seal and fastening strip for sealing a window pane in the context of a motor vehicle. Such a window or glass pane could be provided in a door of the motor vehicle or alternatively provided as an encapsulated glass part that is directly mounted onto the vehicle.

BACKGROUND

In the prior art, a seal and strip arrangement are provided for simultaneously sealing a door window pane and the door opening on a motor vehicle. U.S. Pat. No. 5,743,047 for example, describes such an arrangement.

However, in the processes of manufacturing such as vehicle manufacture, there are ever increasing demands for increased efficiency, and for components that are easy to manufacture and to assemble. There are also ever increasing demands for quality, for example improved seal quality.

SUMMARY OF THE INVENTION

These needs and others are address by a sealing arrangement including a
    fastening strip and a seal for sealing a window in a vehicle according to the teaching of the invention, the seal having a sealing body and a first outer fastening side which in use abuts the fastening strip and a second inner sealing side which in use faces a portion of the vehicle; and wherein the seal comprises an inner engagement surface for engaging with a retention element of the fastening strip,
    wherein the retention element comprises a head portion, the head portion being shaped for ease of insertion into the seal and having one or more retention surfaces for engagement with the inner engagement surface of the seal,
    wherein the seal is deformable being configured to deform to receive the retention element as it is inserted therethrough under force, and, to contract such that the inner engagement surface thereof positively engages with the one or more retention surfaces when the retention element is assembled thereto.

The invention therefore provides a device as claimed in claim 1. Advantageous embodiments are provided in the dependent claims thereto.

In an alternative arrangement, the invention provides a sealing arrangement including a fastening strip and a seal for sealing a window in a vehicle.

In an alternative embodiment, the invention also provides a hostess trolley.

These and other features of the invention will be understood with reference to exemplary embodiments which follow and which are provided to assist in an understanding of the teaching of the invention.

BRIEF DESCRIPTION OF THE DRAWINGS

The present invention will now be described with reference to the accompanying drawings in which:

FIG. 5A is a detailed view of cross-sectional of a retention element provided integral with a fastening strip of an alternative embodiment (for example FIGS. 3-4), assembled and engaged in a preformed perforation a seal according to an embodiment of the invention; FIG. 5B is a cross-sectional view of a retention element provided integral with a fastening strip of an alternative embodiment (for example FIGS. 3-4), assembled and engaged in a preformed perforation in a seal according to an embodiment of the invention having an inner covering layer in a seal; FIG. 5C is a cross-sectional view of a retention element engaged in place in a seal having a thin cover layer such as that of FIG. 5B.

in FIG. 13A a retention feature of the fastening strip is passing through the seal; in FIG. 13B there is no retention feature at the shown.

in FIG. 14A a retention feature of the fastening strip is passing through the seal; in FIG. 14B is a view in a region of the seal and strip where there are no retention elements;

DETAILED DESCRIPTION OF THE DRAWINGS

Figure 1A:
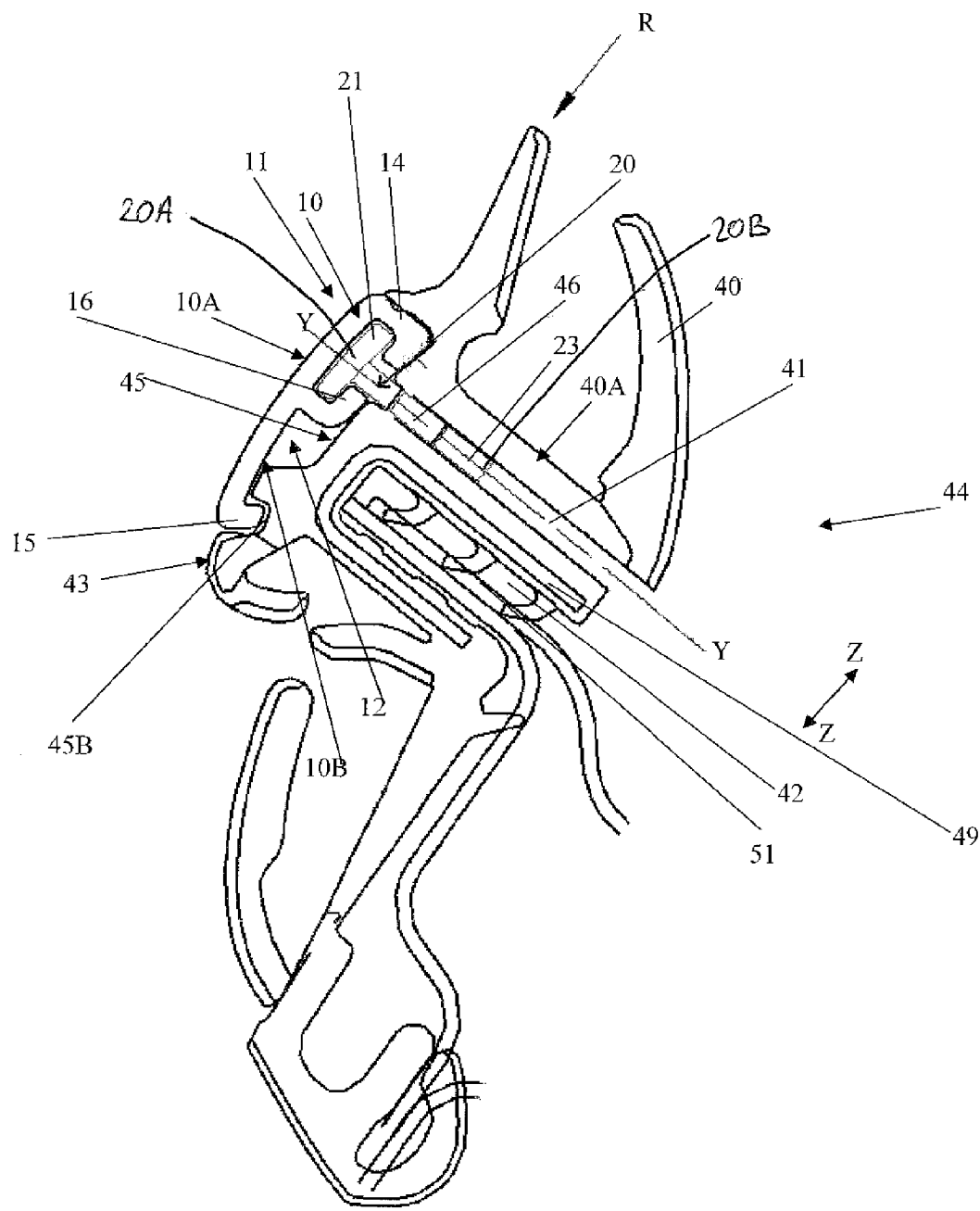
FIG. 1A is a cross sectional view of a seal and fastening strip attached to a flange of a vehicle door.

The teaching of the present invention will now be described with reference to exemplary illustrative embodiments thereof which are provided to assist in an understanding of the teaching of the invention and are not to be construed as limiting in any fashion. It will be understood that where features are described with reference to any one figure or sets of figures that those features could be interchanged with features from other figures or sets of figures without departing from the spirit of the invention.

Referring to the drawings, and initially in particular FIGS. 1A to 2C, a seal 40 and fastening strip 10 are provided for sealing a door window pane and the door opening on a motor vehicle. In use, the seal 40 is connected between and to a flat flange 51 of the door 50 of the vehicle and the fastening strip 10. It will be appreciated that the context of a vehicle door is provided to assist in an understanding of the teaching of the invention and it is not intended to limit the invention to such an application as an arrangement provided in accordance with the teaching of the invention may be utilised in non-vehicle door applications.

In the specification, the term fastening strip has been and is used to describe the outer finishing strip applied to the seal. In the art, terms including trim, trim moulding, finishing strip, strip, or trim moulding finishing strip may also be used to describe this component, and it is not intended to limit the scope of the invention to any one specific wording as the functionality of a fastening strip in accordance with the teaching of the invention will be apparent irrespective of the wording applied to same. Furthermore within the context of the present invention where the fastening strip is described with regard to its functional application in effecting a sealing, through combination with the seal, of the window relative to the vehicle, it will be understood that the present invention is not to be limited to such a context in that the fastening strip could be used for purely decorative purposes. In this way it will be understood that the fastening strip may be provided in a variety of different materials or finishes without departing from the scope of the present invention.

An exemplary seal 40 which may be used within the seal and fastening strip combination comprises a main seal body 40A, an inner side 44 which in use is arranged to face towards and/or to abut a portion of the vehicle door, and an outer fastening side 43 which in use faces outwardly from the vehicle and abuts the fastening strip 10. The outer fastening side 43 comprises a recess or formation 45 for receiving the fastening strip.

The seal 40 and the strip 10 are both typically elongate members. When assembled relative to one another the longitudinal axes of each of the strip and seal are substantially parallel in the X-direction as illustrated in the drawings, for example FIG. 2C. The retention and engagement features provided for assembly and engagement of the seal and the strip are arranged substantially in the Y-direction on assembly as illustrated in the drawings.

While the teaching of the present invention is not to be limited to any specific arrangement of how the seal engages with a window, in a typical arrangement the seal 40 includes sealing lips which bear against the window pane 60 when it is closed. The seal further includes sealing lips which bear against the vehicle when the door is closed. Such seal arrangements are known in the art and are not further described here. The seal 40 comprises a first receiver 42 for receiving the flange 51 of the door and a second receiver for receiving a retention element of the fastening strip. The second receiver may comprise a through hole 41 which is open to the inner side 44 of the seal (FIGS. 1A and 1B) or a blind hole 47 which is closed to the inner side 44 of the seal (FIGS. 2A, 2B, 2C). The blind hole 47 arrangement provides a continuous uninterrupted seal which acts to prevent water ingress. The walls of the receivers 41 and 47 are straight cut particular or dedicated formations or locators corresponding to formations of the retention element of the fastening strip. A cover portion 48 may be provided between the through hole 41 and the blind hole 47 receivers and the outer fastening side 43 of the seal. If provided, the cover portion 48 comprises a plurality of spaced apart perforations 46 which are provided to enable the insertion of retention elements of the fastening strip there through. Alternative embodiments of the perforations 46 are described in further detail with reference to FIGS. 5A to 5C below.

The seal 40 is manufactured for example by moulding or by extrusion processes. Typical materials used for such seals are deformable or have an inherent flexibility or resilience and included for example rubber, or TPE or PVC. The receivers 41 and 47 may be formed as cavities extruded into the profile of the seal and may be accessible through the solid cover portion 48.

A reinforcing element 49 may be provided in the seal located near the receivers 41 or 47 and 42 as shown in the illustrated example embodiments. The reinforcing element 49 may be arranged generally parallel to the walls of the receivers. Such seal reinforcing elements are known in the art and are not described here in further detail.

As shown in FIG. 6, the fastening strip 10 has a first outer decorative side 11 which in use is exposed and a second inner fastening side 12 which in use abuts the seal. An outer surface 10A of the fastening strip may be provided slightly curved in form across the width thereof to match the profile of the vehicle where the fastening strip is to be located. An inner surface 10B is desirably profiled to match the outer profile of the seal against which the fastening strip is located. The fastening strip 10 may be manufactured as a strip or web and may be comprised of aluminium, stainless steel or a plastics material. The form of the strip is such as to correspond to the form of the outer fastening side 43 and the recess 45 of the seal. In use, when assembled to the seal, the fastening strip is seated in the recess 45 of the seal. The recess 45 may comprise one or more locator channels or formations 45A, 45B corresponding to locator formations on the strip to assist in locating and/or fixing of the strip 10 to the seal.

To assist in the location and retention of the fastening strip to the seal, the present invention provides for a plurality of individual retention elements 20 to be provided at spaced apart intervals along the longitudinal axis of the strip and depend from the inner side or surface of the strip 10 in the direction of the seal substantially at right angles to longitudinal axis of the strip and seal in the Y-direction as shown in the drawings.

In this exemplary embodiment of FIG. 6, the retention elements 20 are provided as separate elements formed separately from the strip 10 for assembly thereto. The elements 20 may be retained in the strip 10 by a suitable mechanical means. It will be appreciated that suitable alternative means may be used to retain the retention element, for example, gluing, adhesive, or by design of the retention element.

Referring to the drawings, the retention element 20 comprises a proximal end 20A which in use is that end located in proximity to the strip and a distal end 20B which in use is that end which is configured for presentation and insertion into a seal. The retention element preferably comprises first and second planar surfaces which extend between the proximal end 20A and the distal end 20B thereof. These surfaces are oriented substantially parallel to the longitudinal axis of the strip. The retention element 20 further comprises at least one non planar surface having one or more retention surfaces provided thereon. The one or more retention surfaces may be curved or offset relative to the planar surfaces. Furthermore such surfaces may be provided from one or more barbs or protrusions, or one or more recesses. At least one of the more barbs or retention surfaces is suitably oriented parallel to the longitudinal axis of the strip. One of the barbs or retentions surfaces may be offset relative to longitudinal axis of the strip.

In more detail referring to FIG. 2C, where the retention element is provided as a separate element to the fastening strip but which is engageable with the strip, the element 20 comprises a strip engaging portion 21 provided at the proximal end of the element and a head portion 23 provided at the distal end. The engaging portion and head portion are separated by a stem or spacer portion 22. The strip engaging portion 21 is configured for engagement to the fastening strip. The head portion 23 is configured for presentation to and engagement with the seal and in particular with an inner engagement surface of the seal when the fastening strip is assembled thereto. Such a retention element is typically rectangular in form having four surfaces between the proximal and distal ends thereof. The front and back surfaces 26 of the element 20 define first and second generally planar surfaces. The side surfaces 27, those surfaces which include the retention surfaces are non-planar in that the retention surfaces break up the planar form. The retention element is desirably orientated relative to the fastening strip such that the side surfaces are along the longitudinal axis of the strip.

The stem or spacer portion 22 is configured to space the head portion 23 apart from the strip engaging portion 21 and to locate the element 20 and in particular the one or more retention surfaces so provide a positive engagement of the retention surfaces directly with the seal as required to achieve a secure engagement. The length dimension of the stem portion 22 is thus related to the material properties of the seal. Parameters which are useful to determine an optimum length for the stem portion include for example the flexibility or resilience or mass of the seal material. To achieve a secure engagement between the retention element and seal, a sufficient mass or volume or depth of the seal must be engaged with the retention surface or surfaces of the element to retain it in place. In particular the depth d1 of the seal and the width w1 of the retention surface may be varied to achieve a particular retention force.

The retention element 20 must also be sufficiently strengthened or stiffened to ensure that it can penetrate the seal, or cover portions or cover layers as required. Clearly, other dimensions of the retention element 20 for example maximum cross-sectional area of the element will also be related to the material properties of the seal. The cross-sectional area of the stem may also be configured to substantially correspond to that of the perforations 46 within the seal to ensure a close fit between them. The cross-sectional area of the stem is desirably less than that of the maximum cross-section of the head portion.

In the case where the seal comprises a receiver 41, 47 and the head portion 23 is configured for insertion into the receiver to be retained against an inner surface of the seal cover portion 48, then the stem portion 22 is configured to locate the head portion within the receiver and is related to the depth of the seal cover portion 48 in the Y-direction.

Referring to the drawings and in particular FIG. 2C, the retention element 20 is shown assembled to a seal 40 and being retained against an inner surface 48A of the seal cover portion 48. The head portion 23 of the retention element 20 in this case has a v-shaped or arrow-head form having a point 24 at the distal end 20B and tapers outwardly to barbs or undercuts 25 which are provided at a base portion of the head. The head 23 is formed such that undercuts or barbs 25 define and present retention surfaces or shoulder portions 28 where the head 23 is cut back from the extremities of the barbs 25 to the stem portion 22. In this exemplary case, the shoulder portions 28 are arranged at an obtuse angle to the stem portion and as such taper inwardly to the stem from the extremity of the barbs 25. The shoulder portion provides therefore in this example a curved arcuate surface.

This arrangement provides for at least one of improved location, retention, self centring, and also may allow control of pull-off force or the force required to remove the retention element from the seal. In certain applications, is desirable that the strip can be removed/replaced without damaging the seal. The form of the shoulder portion and the barbs also reduces any damage to the seal during removal or replacement of the strip.

It will be appreciated that the shoulder portions may be arranged at suitable alternative angles to the stem based on the particular requirements, such as the relative dimensions of the perforations and retention elements and/or the flexibility of the seal materials. See for example FIG. 6D in which the cutbacks from the barbs to the stem are substantially at right angles to the stem.

The extremities of the barbs 25 may also rounded so as to provide for ease of pulloff. In the illustrated embodiment of FIG. 6D, the distal end 20B of the retention element 20 comprises a point 24 of the head 23 and the head tapers outwardly from the point 24 to the barbs 25 and retention surfaces 28. However, it will be appreciated that the head may comprise a different form, for example, it may be rounded (see FIG. 6D for example) or may comprise a domed or u-shaped form.

While the retention element has been described with reference to two barbs provided on each of the side surfaces, such barbs will be understood be considered as exemplary of the type of retention surfaces that may be used on the retention element to effect relative engagement between the retention element and the seal. Other formations, such as ribs provided along the length of the retention element may be provided as alternatives or in addition to the barbs described to effect the securing of the fastening element to the seal.

When a retention element 20 is assembled to the seal 40 the retention surfaces 28 engage positively with corresponding engagement surfaces 48A of the seal. In this case, the engagement surfaces 48A are those surfaces on the inner seal side of the cover portion adjacent the perforation 46 which engage the shoulder portions 28 of the head. The forces acting to retain the retention element 20 in the seal include forces between the engagement surfaces 28 and the seal retention surfaces 48A.

As shown in the drawings the barbs 25 and the retention surfaces 28, and the front and back surfaces 26 of the element are presented substantially parallel to the longitudinal axes of the strip and seal on assembly. The forces acting between the retention surfaces 28 and the seal 40 act substantially in the Y-direction.

The front and back surfaces 26 of the retention element 20 have generally flat or planar forms, and, as shown in the illustrated examples, and the element has a low depth or thin profile (in the Z direction, see FIGS. 1-2 for example). The depth of the element between the front and back faces is less than the width across the front and back faces i.e. the width between the extremities of the barbs (X-direction). The low depth or thin profile of the retention element has advantages including minimisation of package space required and reduction of weight. The profile is also configured for ease of insertion/piercing of the seal. The package space in the context of a vehicle is often defined by standards for example relating to safety issues. For example in the illustrated embodiment of FIGS. 1 to 2, the space between the door flange and vehicle body is designed to accommodate the seal lips, the seal body and also the retention element. The use of a retention element which is substantially planar and has a low depth in the Z-direction with the engagement surfaces being arranged in the direction of the longitudinal axis of the strip and seal clearly has advantages from the point of view of minimising space requirements.

The retention element 20 is assembled to the seal by presenting the distal end 20B to the outer fastening strip side 43 of the seal. The retention element is pushed with force into the seal. Such presentation provides for a deformation or expansion of the seal to enable insertion of the element into the seal. The element 20 is inserted into the seal until it is fully received therein such that the retention surfaces 28 engage with inner engagement surface of the seal. When the element is fully inserted into the seal, the previously deformed or expanded seal contracts or returns again in the direction of the element towards its initial rest position and in so doing contracts into engagement with the engagement surface or surfaces of the retention element.

In more detail considering the element 20 as shown in FIGS. 1 to 2, the pointed form 24 of the head portion 23 at the distal end additionally assists in assembly of the fastening strip to the seal. The retention element 20 is assembled to the seal by first of all presenting the distal end 20B to the outer fastening side of the seal. The head portion 23 is pushed with force into the seal, the form of the head portion 23 which tapers outwardly from the point 24 provides deformation or expansion of the seal to receive the head, and the wider barbs 25 and shoulder portions 28. The head portion is continued to be inserted into the seal until it is fully received therein such that the retention surfaces 28 engage with inner engagement surfaces of the seal. The inner engagement surfaces of the seal are defined by their contact with the retention surfaces 28 of the barbs 25. The cross-sectional area dimensions of the stem are smaller that those of the base of the head portion, and when the stem is received in the seal, the seal having previously deformed or expanded to receive the head portion contracts or returns again in the direction of the stem 22 to its initial rest position.

In a further embodiment, the walls of the perforation 46 may contract close to the stem 22, depending on the relative dimensions of the stem and the perforation.

The head portion 23 of the retention element 20 is inserted into the seal in a direction substantially at right angles to the longitudinal axis of the seal and to the outer fastening surface of the seal. The shoulder portions 28 engage the seal along the longitudinal axis. The form of the retention element and the manner in which it is engaged with the seal is such that the forces which engage the retention element in the seal act to prevent movement of the retention element in a lateral direction (Y direction, FIG. 1 for example). When assembled the barbs 25 engage the seal and also prevent any movement of the retention element 20 relative to the seal body in a longitudinal direction (X direction). As noted above the retention elements are also provided engaged with the finishing strip 10 and so effectively fix the finishing strip laterally and longitudinally relative to the seal.

Figure 1B:
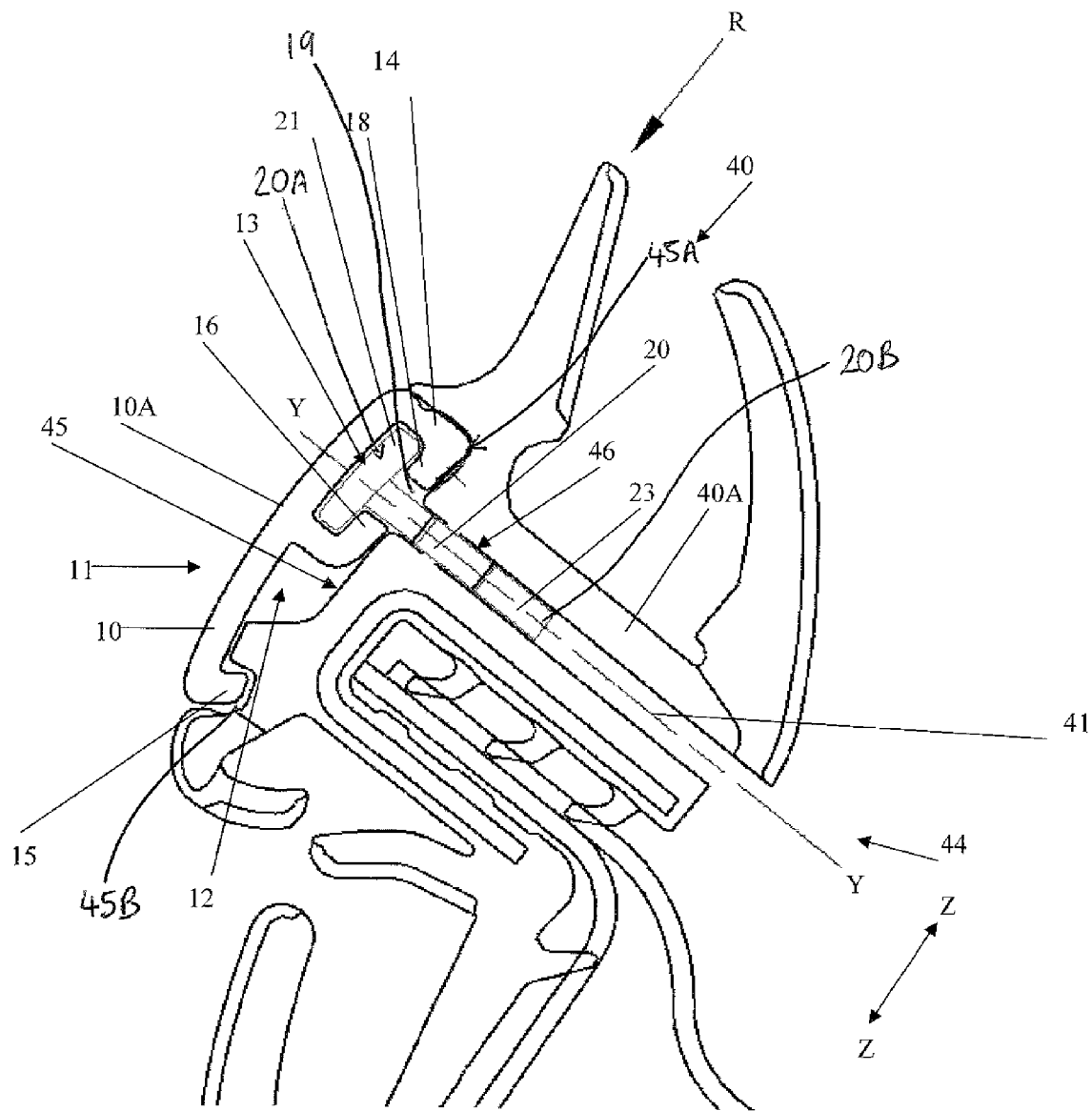
FIG. 1B is a detailed view of FIG. 1A.
Figure 2A:
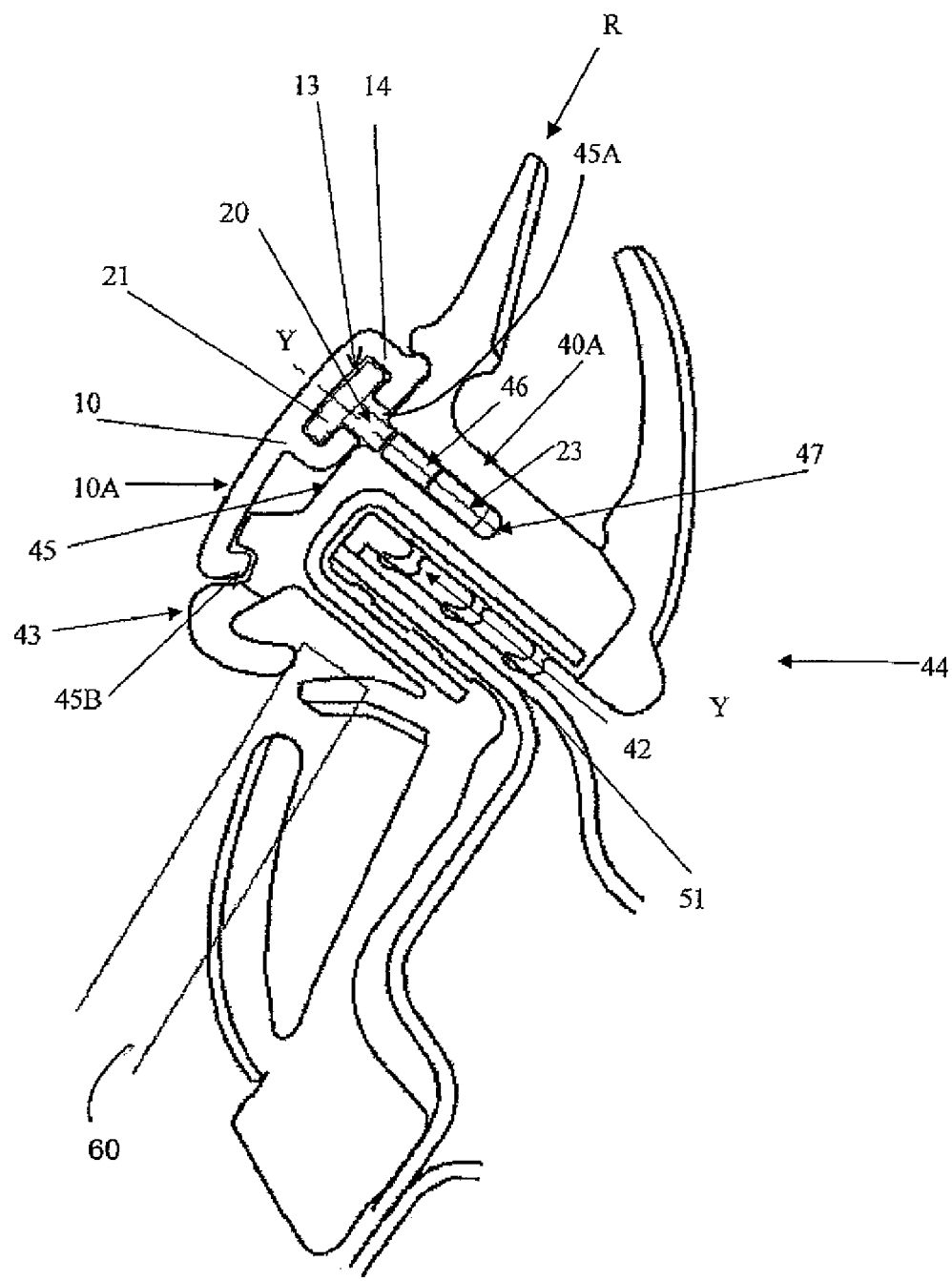
FIG. 2A is a cross sectional view of an alternative seal and fastening strip according to the invention.
Figure 2B:
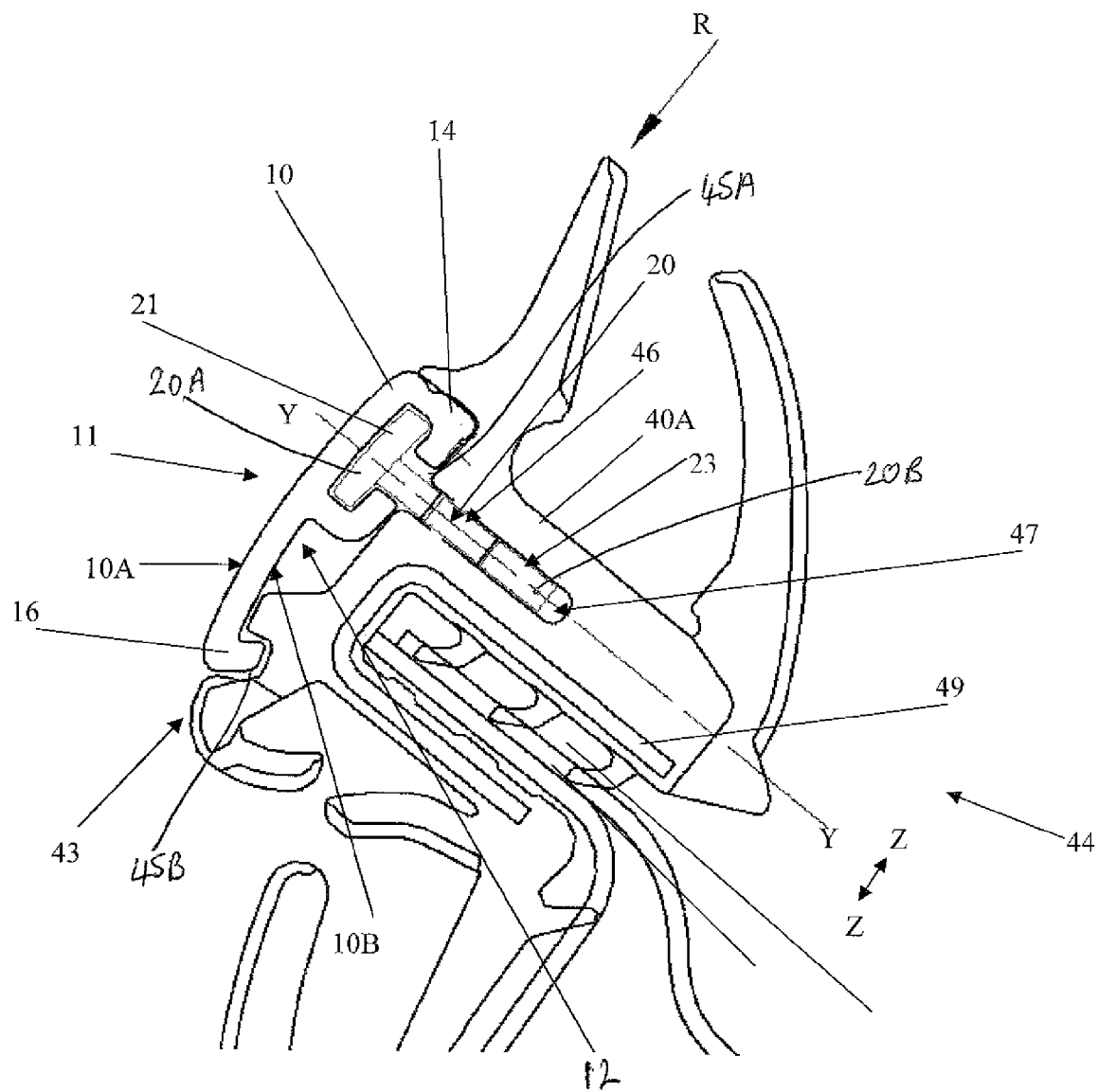
FIG. 2B is a detailed view FIG. 2B.
Figure 2C:
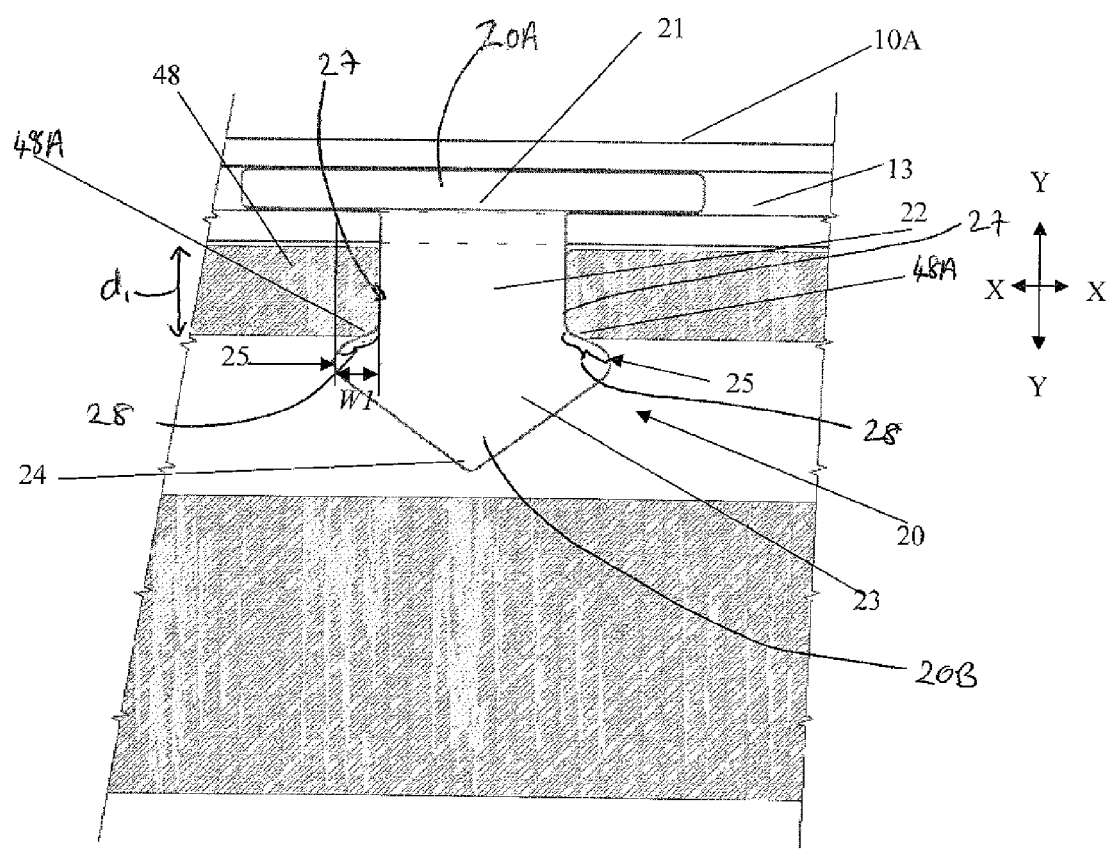
FIG. 2C is a cutaway cross-sectional view through the axis Y-Y of a fastening strip assembled to the seal from the direction R showing details of the retention element.
Figure 6A:
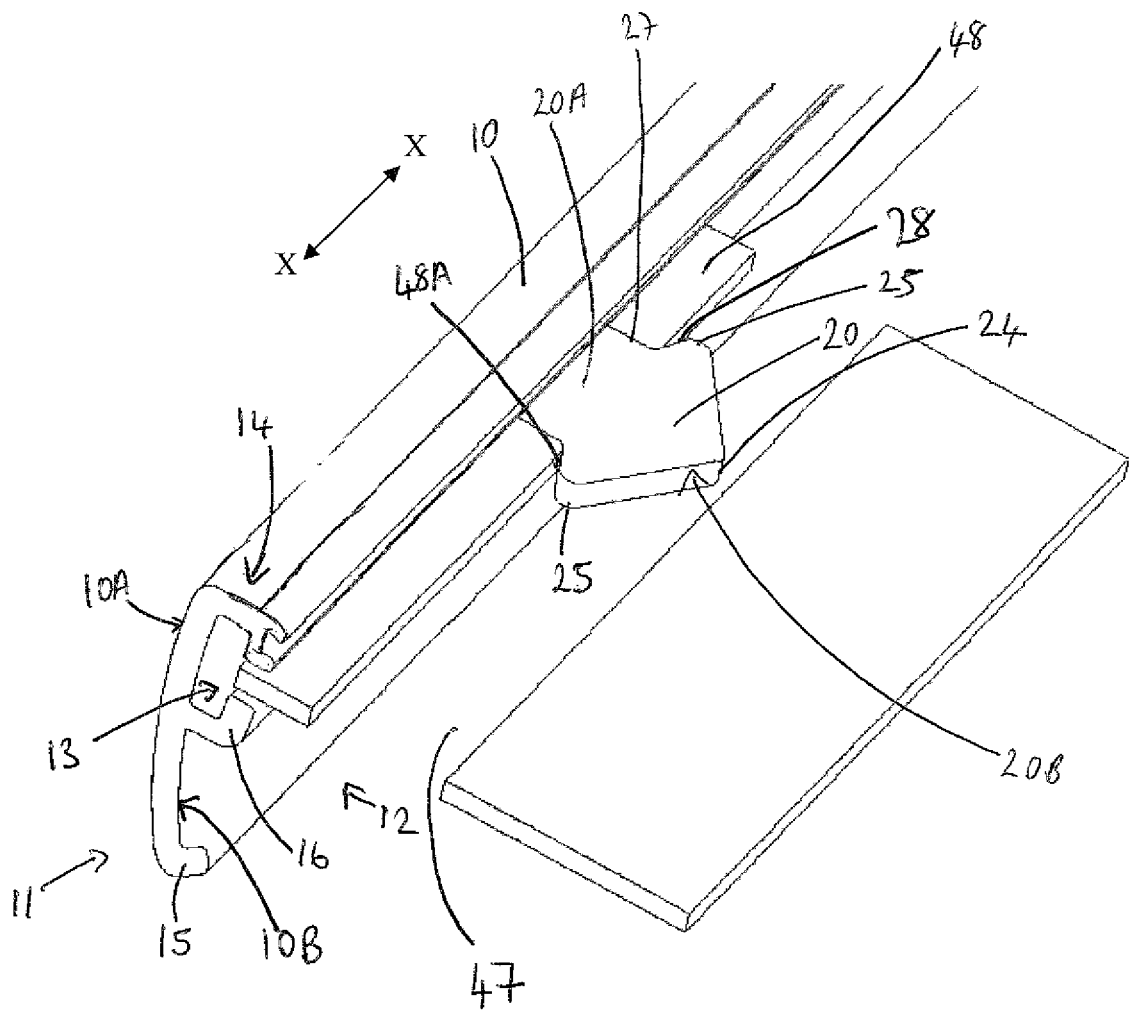
FIG. 6A is a schematic perspective view of a fastening strip according to the invention.
Figure 6B:
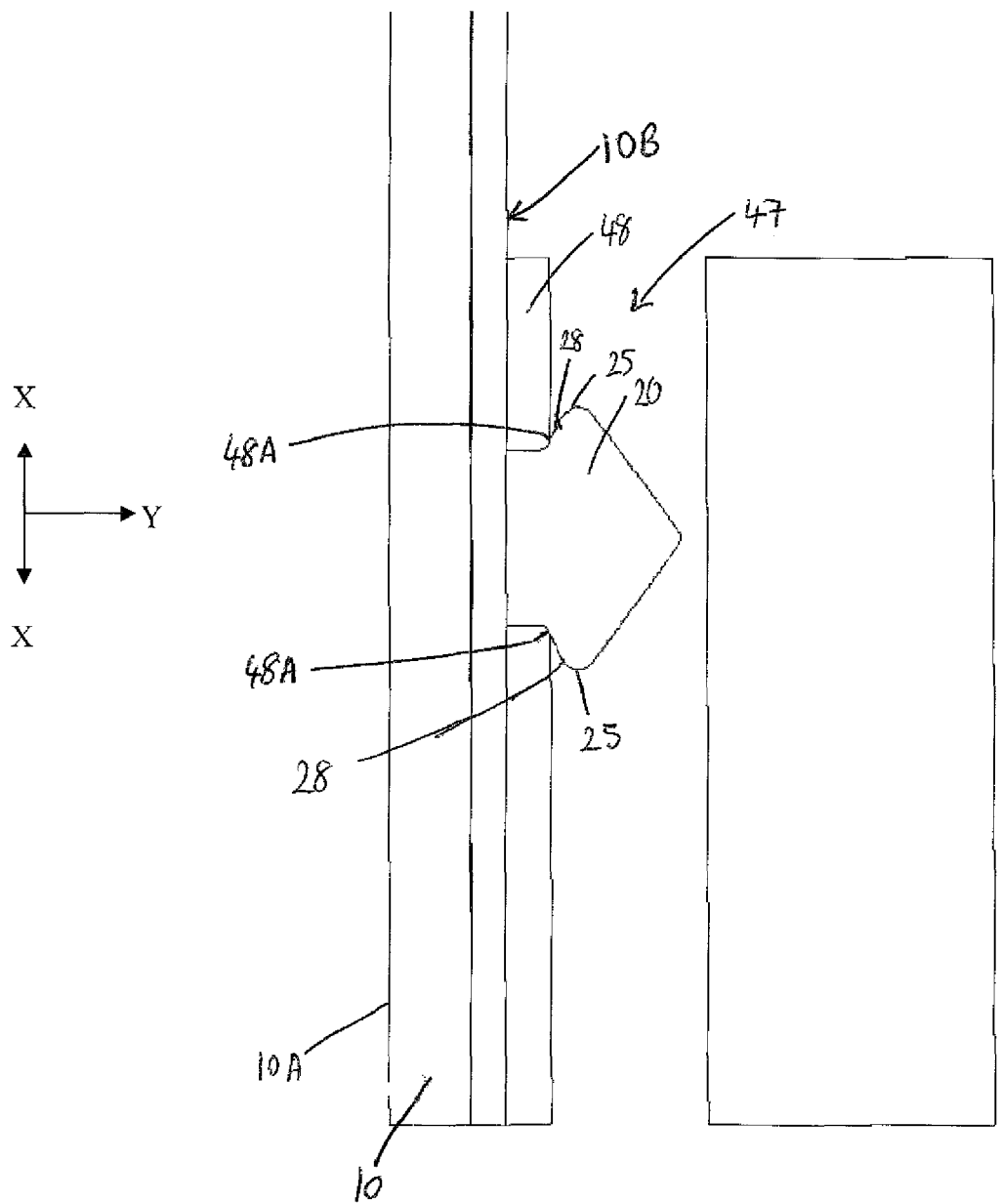
FIG. 6B is a plan view from above of the fastening strip of FIG. 6A.
Figure 6C:
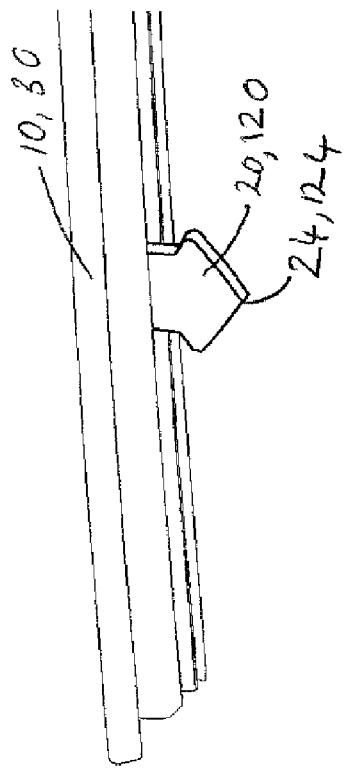
FIG. 6C is a perspective view of a fastening strip according to the invention.
Figure 6D:
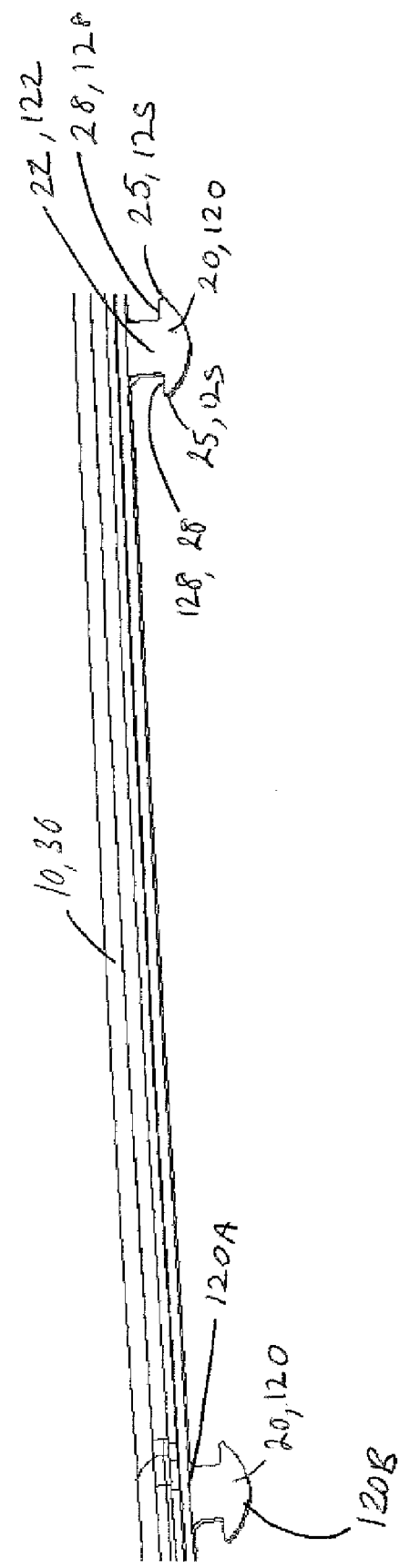
FIG. 6D is a perspective view of a fastening strip according to the invention in which the retention features have an alternative form.

Referring to FIGS. 1B and 2B and FIG. 6A, some features of the strip 10 of an exemplary embodiment are described in further detail. In this case, the inner surface of the fastening strip comprises front, back and central depending wall members 14, 15 and 16. The depending wall members may be configured as strip locator features corresponding to seal locator features 45A, 45B provided in the recess 45 to assist in assembly and retention. The locator features may be formed as channels or recesses. It will be appreciated that alternative corresponding locator features may be provided. In the case where the retention element is provided as a separate component for assembly to the strip the depending wall members 14 and 16 together with the inner surface 10B of the fastening strip together define a recess 13 for receiving and retaining one or more retention elements 20 therein. The form of the depending wall members, recess and top portion of the retention element could clearly be altered to achieve a different orientation of the retention element if required.

The strip engaging portion 21 of the retention element 20 is designed to be received and held in place in the recess 13 of the fastening strip 10. The top portion may be inserted into the recess 13 by insertion from each end of the strip. Alternatively localised slots may be provided at spaced apart intervals in members 14 and/or 16 to enable a retention element 20 to be inserted into the recess 13 near to the desired location. A snap-in characteristic avoiding the need for such slots is also possible. The form of the top portion 21 is such as to accommodate tolerances of profile of the features 14, 16, and the recess 13 and manufacturing tolerances of top portion 21. The retention elements may additionally be fixed in place in the fastening strip by adhesive, or other suitable means.

The invention thus in one arrangement provides for the separate manufacture of the fastening strip and of the retention elements for assembly to the strip, as required. This has advantages including provision of a simplified manufacturing process, and increased flexibility in location of retention elements to a particular application. The material of the retention element may be selected as required with flexibility and may be different to that of the fastening strip itself. The separate provision of fastening strip and associated retention elements has the further advantage that after retention elements have been assembled to a corresponding seal, for example in the event that the outer strip is damaged it would be possible to remove and replace the fastening strip while leaving the retention elements in place in the seal.

Figure 3A:
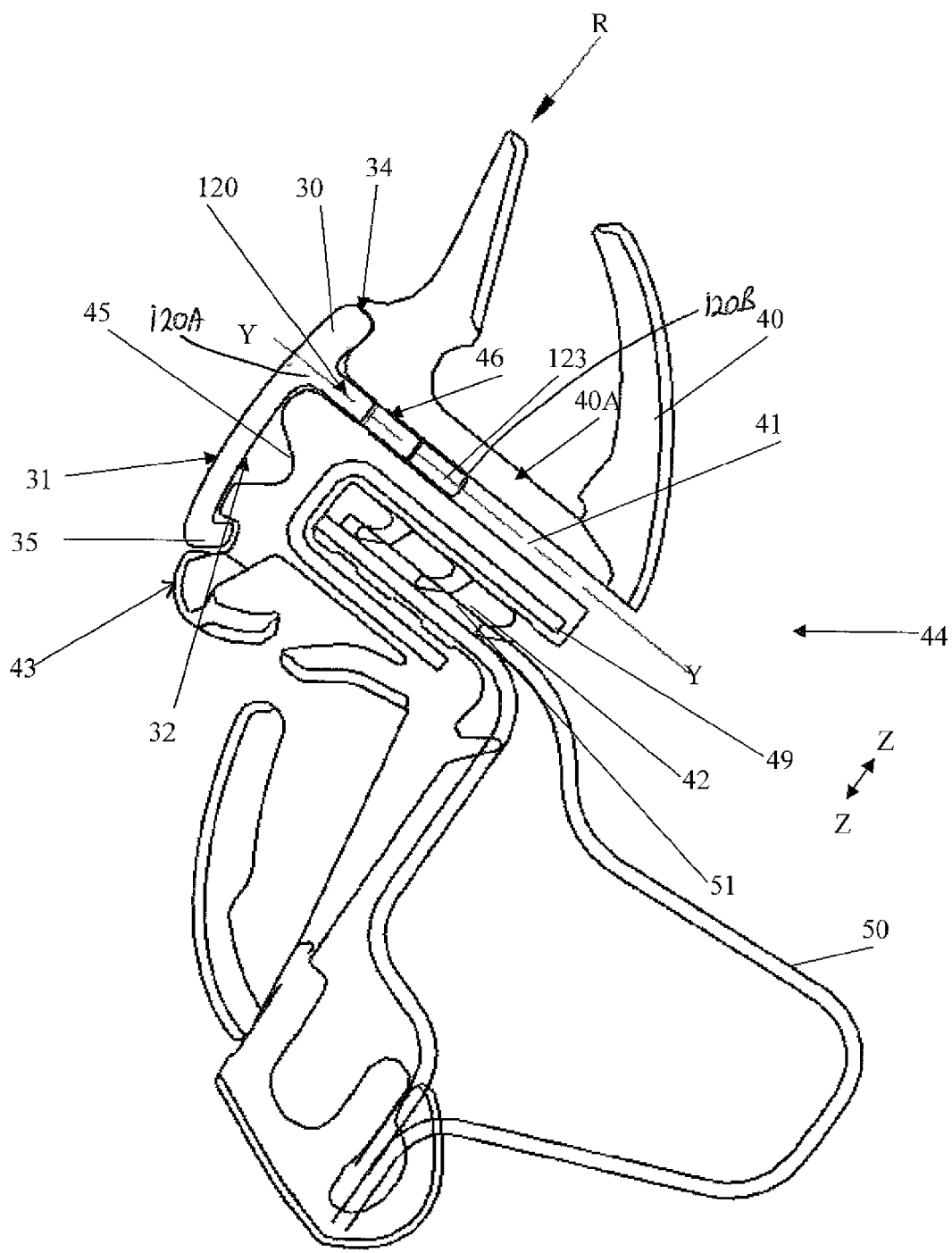
FIG. 3A is a cross-sectional view of an alternative fastening strip according to the invention.
Figure 3B:
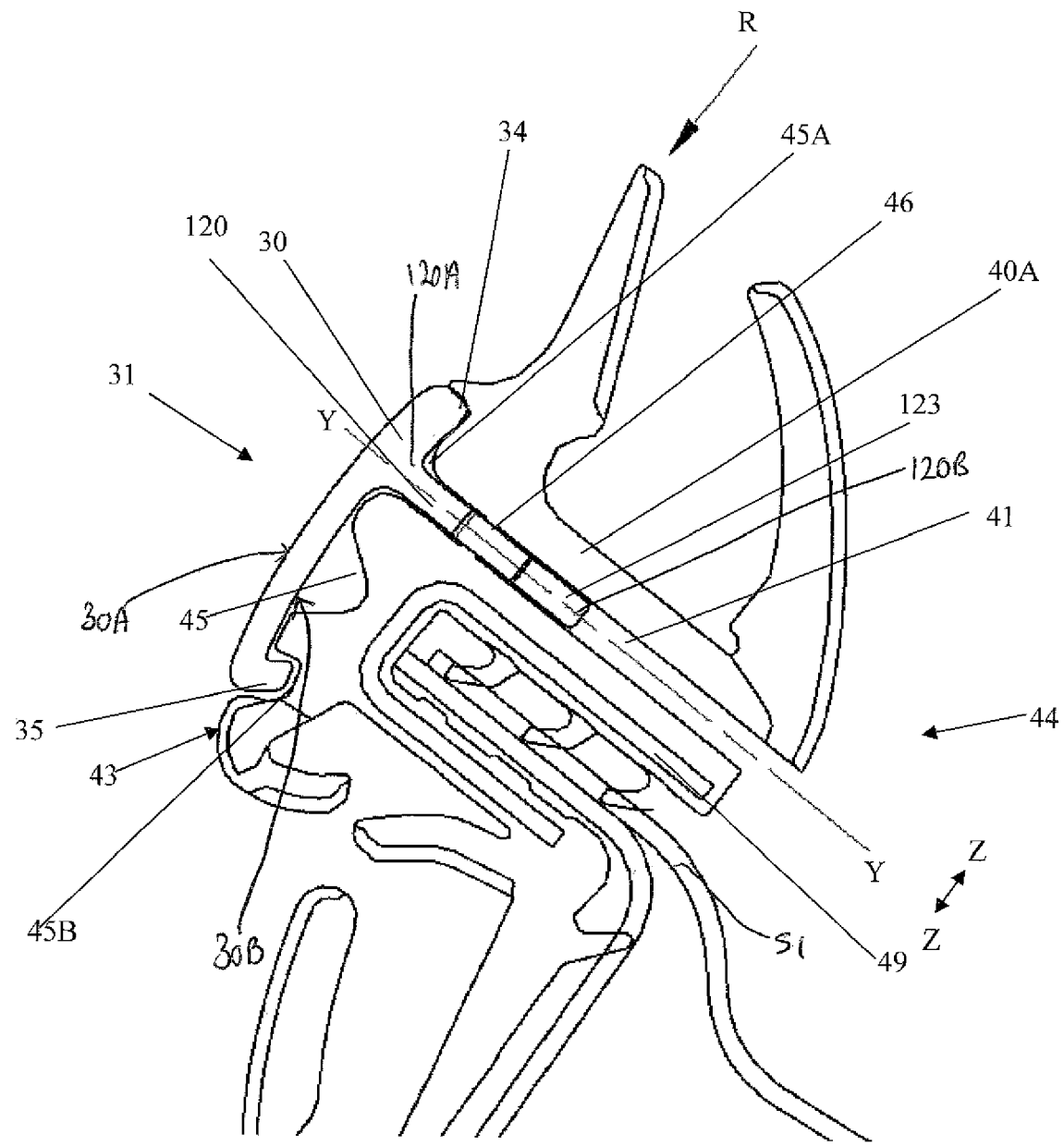
FIG. 3B is a detailed view of FIG. 3A.
Figure 4A:
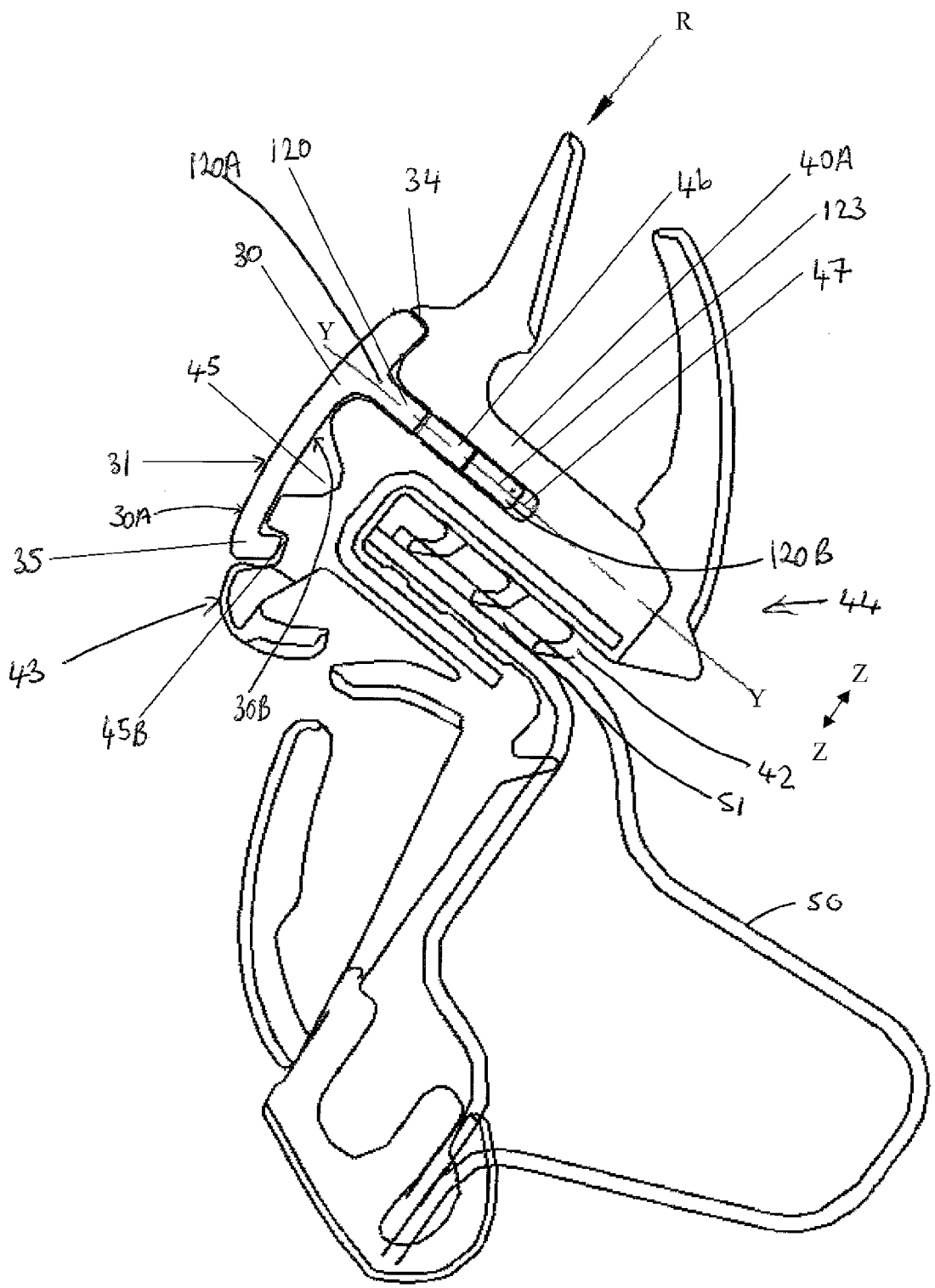
FIG. 4A is a cross-sectional view of the fastening strip of FIG. 3A used with an alternative seal according to the invention.
Figure 4B:
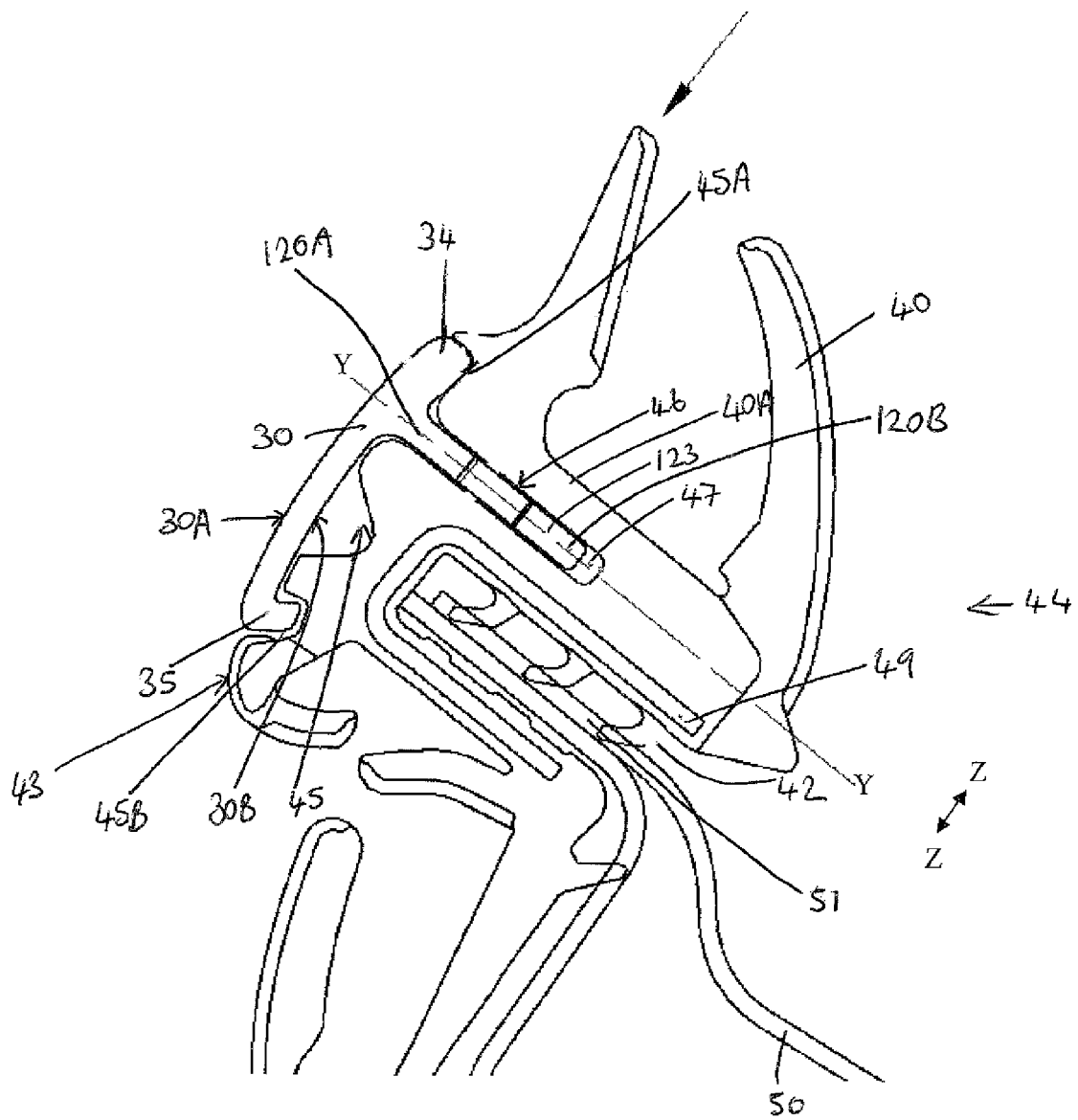
FIG. 4B is a detailed view of FIG. 4A.

Referring to FIGS. 3 to 4 an alternative embodiment of the invention is shown. The fastening strip 30 comprises a first outer side 31 which in use is exposed and a second inner fastening side 32 which in use abuts the seal 40. The strip 30 is manufactured as a strip or web and may be comprised of aluminium, stainless steel or plastic. In this case, a fastening strip 30 comprises integral retention elements 120, which depend from the inner side of the strip 30 substantially at right angles thereto in the direction of the seal and are spaced apart along the length of the strip. The front and back surfaces of the retention elements being oriented substantially parallel to the longitudinal axis of the strip, and are desirably substantially planar.

The retention elements 120 are formed as an integral part of the fastening strip and may be of aluminium, stainless steel or plastic as determined by the material chosen for the strip. The use of such retention elements in effecting engagement of the seal and strip is as was described before with reference to the separately provided elements, and the same reference numbers have been used to identify similar features which have been described above.

The fastening strip 30 comprises an outer surface 30A and an inner surface 30B. The outer surface 30A in this case is slightly curved in form across the width thereof. The fastening strip 30 has a web form comprising depending front and back wall members 34, 35 and one or more retention elements 120. The form and location of the depending members 34, 35 and 120 is such as to correspond to the form of the outer fastening side 43 of the seal 40. In use the fastening strip is seated in the recess 45. The outer recess 45 of the seal and the inner side of the strip may comprise alternative corresponding locator features, for example channels and depending walls.

Referring to FIGS. 3, 4 and 5A the retention element 120 is described in more detail. The retention element in similar in form to the retention element 20 described above having a proximal end 120A and a distal end 120B, a strip engaging portion 121, a stem portion 122 and a head portion 123. In this case, the retention element is integral with the inner surface of the strip at the proximal end thereof. The remaining features of the retention elements 20 and 120 are similar.

The head portion 123 has a v-shaped or pointed arrow form which tapers out from a point 124 to barbs 125 which present the widest part of the head. The head portion is cut back to the stem 122 at the barbs 125 defining retention surfaces or shoulder portions 128 for engagement with an inner engagement surface of the seal. The retention element 120 comprises front and back surfaces 126 each having a generally flat or planar form. The front and back surfaces extending between the proximal and distal end of the element. The retention element comprises non-planar surfaces having barbs defining the retention surfaces.

The retention element 120, as shown in the illustrated examples, has a low depth profile with the depth of the element being less than the width across the front and back faces thereof. The stem portion 122 spaces the head portion 123 apart from the strip engaging portion 121 and locates the head portion as required for it to be engaged directly with an engagement surface of the seal. The barbs 125 are arranged on opposite sides of the head portion 123. The retention element 120 is arranged such that the opposed barbs extend generally in the longitudinal (X-direction)

The pointed form of the head portion 123 assists in assembly of the fastening strip 30 to the seal. In this case sections of the material of the cover portion 48 of the seal are pieced at intervals to form perforations 46 to enable the head portion of the retention element to be inserted into the seal and to pass through the material of the seal cover. The perforations 46 are configured to be smaller than the head portion of the retention element, so that when passed through a perforation the barbs 125 and shoulder portions 128 engage with and are retained against the inner side of cover portion 48 adjacent the perforation 46. As described above with reference to the retention element 20, the dimensions of the retention element, and the length and width or cross-sectional area dimensions of the stem portion 122 are configured in view of the material properties of the seal cover portion; namely the elasticity, resilience, the depth of the seal, and the required location of the retention element relative to the seal. It will be appreciated that there must be a sufficient mass of the seal behind the retention surfaces 128 to maintain a positive contact between the retention element and the seal such that the two do not flex during normal use. The head portion of the retention element provides expansion of the seal to receive the wide base portion and the seal then contracts around the stem 122 and in so doing the retention surfaces of the inner side of the cover portion 48 adjacent the perforation 46 engage with the retention surfaces or shoulder portions 128 of the retention element.

Referring to the drawings and in particular FIGS. 5A-5C, alternative embodiments of the cover portion 48 are described.

Referring to FIG. 5A, the cover portion 48 may be pierced or cut at intervals to provide preformed localised perforations 46 to allow a retention element of the fastening strip 10 to pass through the cover portion 48 into the receiver. Again, the perforations 46 are dimensioned to be smaller than the head portion 23 of the corresponding retention element so that when assembled the barbs or undercuts 25 are retained against the inside of the cover portion 48 adjacent the perforation at retention surfaces 58 of the seal.

In this case where the cover portion 48 of the seal comprises one or more perforations 46, the head portion 23 is presented to the perforation, and acts to provide expansion of the perforation and seal to receive the full width of the head portion 23 as it is inserted there through as described above.

Referring to FIGS. 5B and 5C in an alternative embodiment, the cavity of the receiver may have a solid cover portion 48 in which a relatively thin cover layer or membrane 46' is provided on the inner side of the cover portion. The layer 46' may be provided between a preformed perforation 46 and the receiver, and arranged such that the cover layer 46' may be perforated by the head of the retention element on assembly. The cover layer 46' may be provided by a membrane provided to the inner seal side of the cover portion. The cover layer is thin relative to seal body or seal cover portion.

In a case where a thin cover layer 46' is provided to the inner side of the cover portion 48 or to the inner side of the cover portion at perforations 46. The head portion as previously described provides expansion of the perforation and additionally provides cutting or piercing of the thin cover layer. Provision of the membrane or thin cover layer 46' is advantageous from the point of view preventing water ingress and minimising openings in the seal.

Figure 5D:
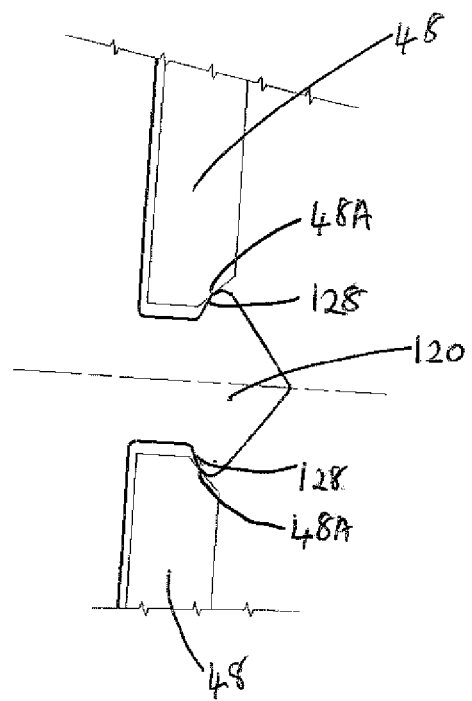
FIG. 5D is a cross-sectional view of a retention element provided integral with a fastening strip inserted into a seal according to a further embodiment of the invention the seal having a thin cover layer.

Referring to FIG. 5D, the inner surface of the cover portion 48 may be shaped or curved at the area where with cover portion engages the retention surface of the element.

In an alternative embodiment, the cavity may have a solid cover portion 48 which does not have preformed perforations 46 but rather is perforated directly by the retention element on assembly of the strip and the retention element to the seal. Alternatively, the perforations may be formed as score lines which are not cut through to the receiver leaving a relatively thin cover portion between the seal and receiver.

In this case where the seal 40 does not comprise any perforations or openings, at the point where the head portion 23 is presented to the seal 40 it effectively provides for piercing or cutting of the seal to directly form a perforation or aperture in addition to providing deformation or expansion of the seal to receive the element. Such an arrangement is described further below with reference to FIG. 9A.

In an alternative arrangement the receiver may be provided by an extruded portion of the seal which is provided to be pierced by the head portion of the retention element such that it is held in place embedded in the seal material. In this latter case, the extruded portion may be of different strength or thickness to other portions of the seal. In such an arrangement, the retention element is inserted fully into the seal material. The seal material deforms to receive the retention element and contracts back in the direction of the element and in so doing engages directly with the retention surfaces thereof.

Figure 5E:
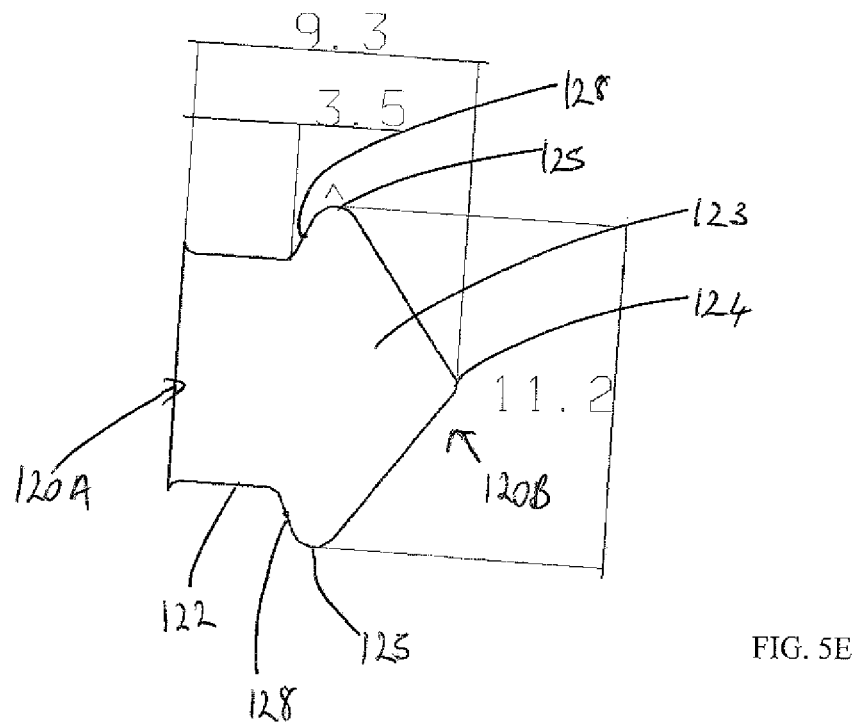
FIG. 5E is a detailed view of an example retention element of FIGS. 5A to 5D.

Referring to FIG. 5E and example retention element is shown.

Referring to FIGS. 6A, 6B, 6C and 6D a section of a fastening strip 30 for use with a seal is shown. Again similar references will be used for previously described integers or elements.

Three or more retention elements are normally provided located along the length of the interface between the seal and the fastening strip to achieve the necessary alignment and engagement between the two items along their longitudinal axes.

Figure 7A:
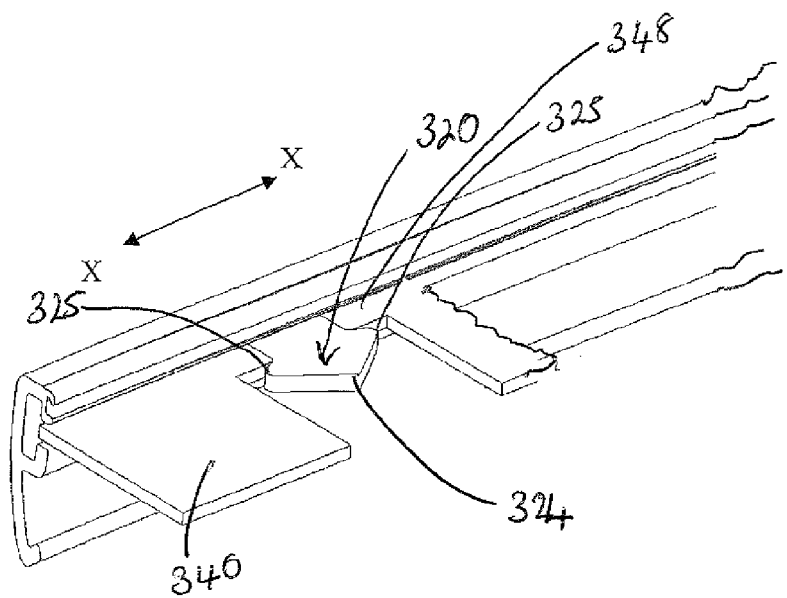
FIG. 7A is a schematic perspective view of a fastening strip and seal according to an alternative embodiment of the invention, the seal being an encapsulated seal.
Figure 7B:
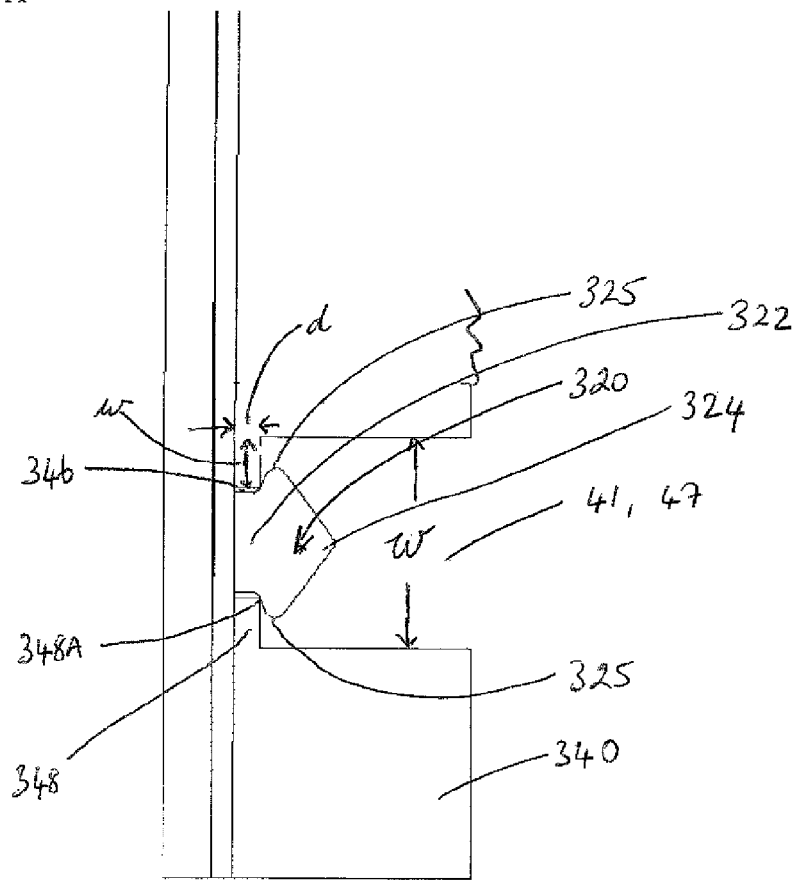
FIG. 7B is a plan view from above of the fastening strip and seal of FIG. 7A.

Referring to FIGS. 7A and 7B an alternative seal arrangement is described. The seal 340 comprises an encapsulated seal which is described in further detail with reference to FIGS. 11 to 17. The seal includes a receiver 41, 47 formed to receive the retention element, the receiver being a cut out area of the seal and having a step form to define the cover portion 348 and engagement surfaces 348A of the seal. The width W of the receiver 41 and the depth d and width w dimensions of the seal cover portion 348 are selected to accommodate the retention element and so that the seal cover portion has sufficient flexibility to enable it to deform to receive the retention element and contract again to engage with the retention element shoulder portions or retention surfaces to retain the retention element and the strip in place during normal use. The cover portion 48 is also preferably sufficiently flexible to deform to enable the strip to be removed as required under the application of a force.

Figure 8:
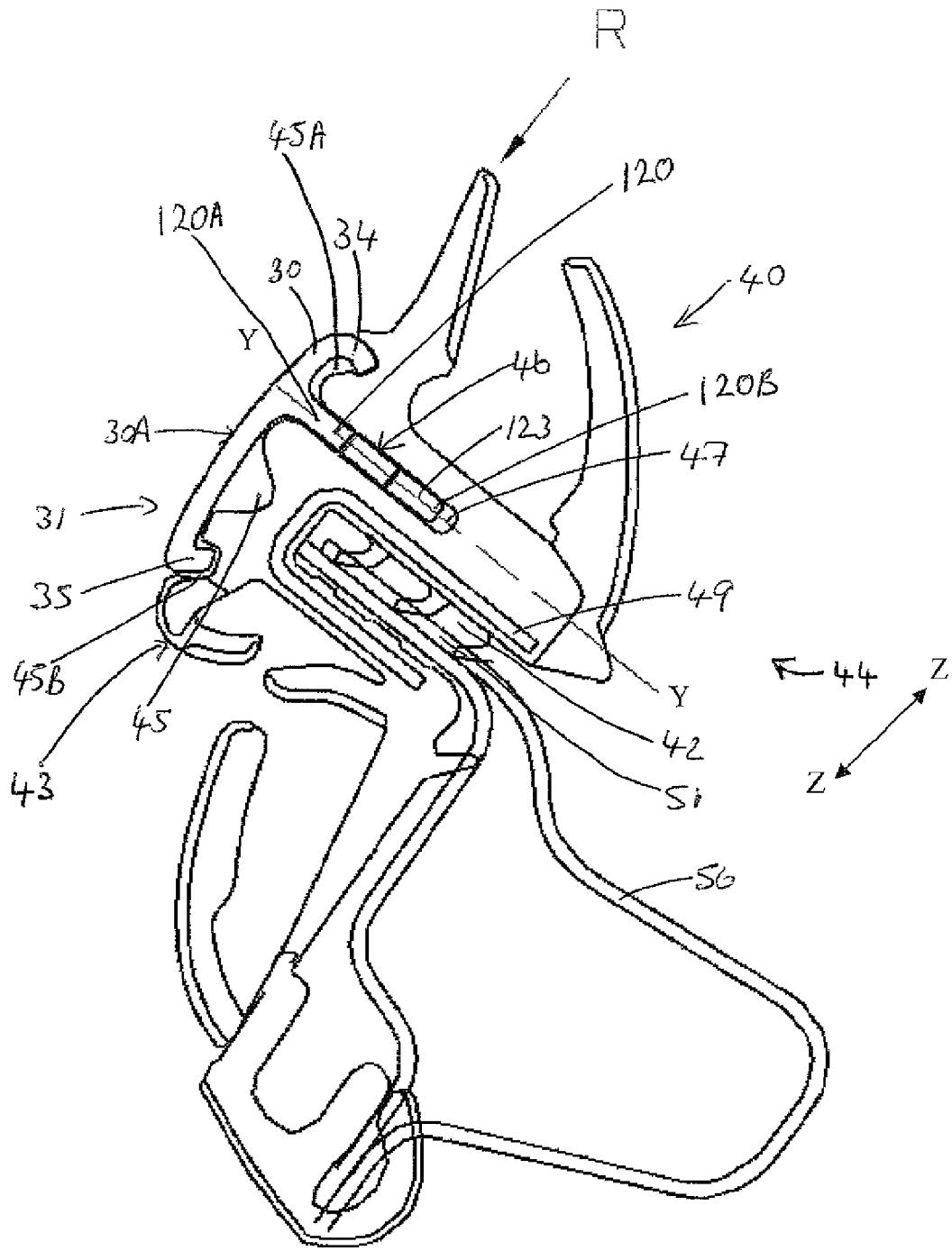
FIG. 8 shows a cross-sectional view of seal and a fastening strip according to the invention in which the two components are engaged.
Figure 9A:
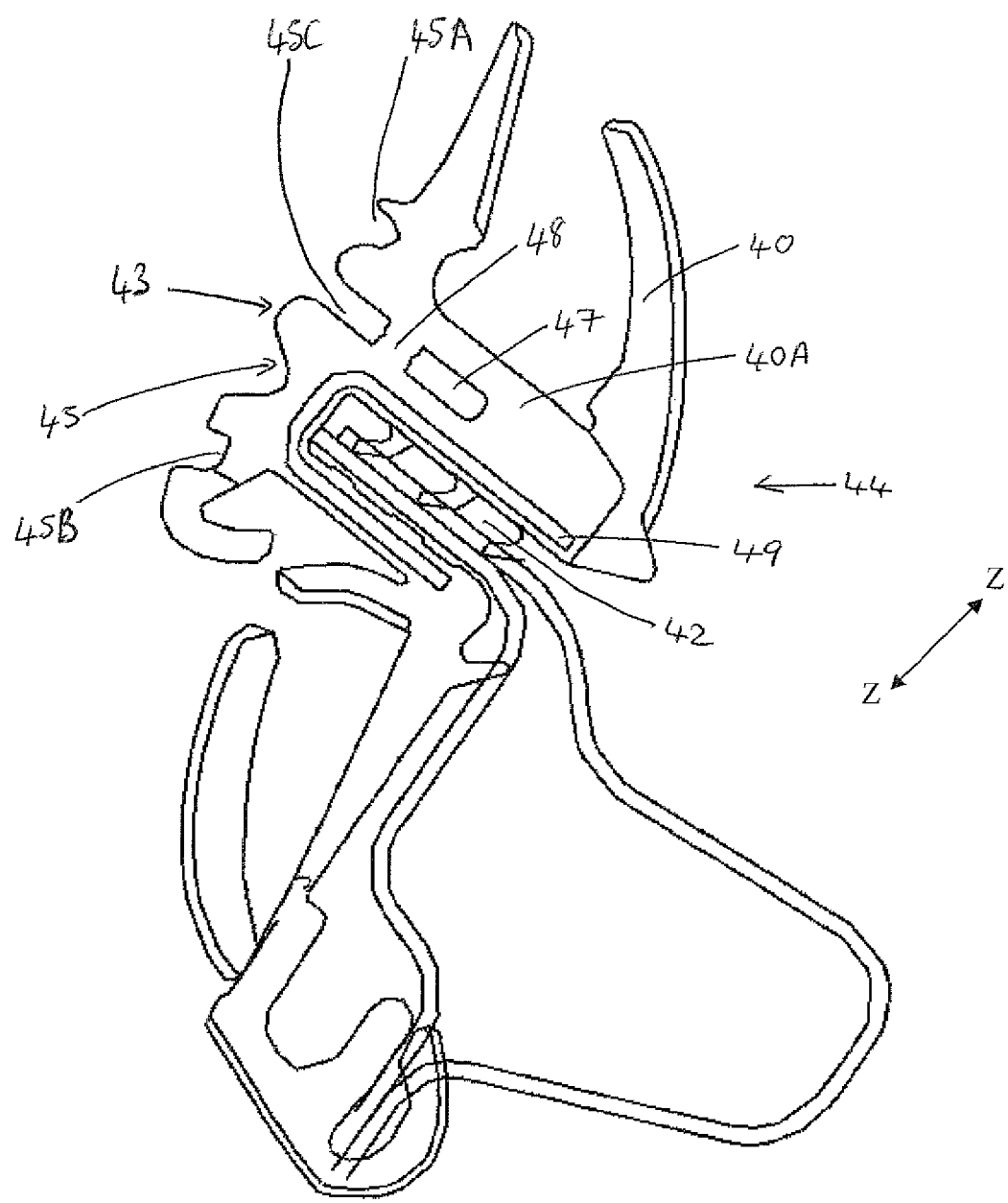
FIG. 9A shows the seal of FIG. 8 without a retention feature being engaged therein illustrating in detail the form of the outer strip side of the seal.

Referring to FIGS. 8 and 9A an alternative embodiment according to the invention is shown. The seal 40 as described previously comprises an inner seal side 44 which in use is arranged to face towards and/or to abut a portion of the vehicle door, and an outer fastening side 43 which in use faces outwardly from the vehicle and abuts the fastening strip 30. The outer fastening side 43 having channels or recesses 45A, 45B and 45C for receiving locator features and the retention element of the fastening strip. The seal 40 comprises a receiver 42 for receiving a portion of the vehicle door and a receiver 47 for receiving a retention feature of the fastening strip 30. The fastening strip 30 as described previously comprises a retention feature 120 having a head portion 123 for insertion into and engagement with the seal.

The receiver 47 comprises a cover portion 48 provided between the receiver and outer fastening side of the seal. In this case, the cover portion 48 is continuous and does not comprise preformed perforations. In this case, the cover portion is pierced directly by the head portion 123 of the retention feature 120. At the distal end the head portion 123 comprises a pointed arrow form, the pointed form enables piercing of the cover portion 48. Barbs 125 and the retention surfaces or the shoulder portions 128 at the base of the head portion then engage with the inside of the cover portion 48 to securely hold the retention feature in place.

It will be appreciated that other alternative arrangements may also be provided. In one case, the receiver 41, as described previously may be provided with a continuous cover portion (as described above with reference to receiver 47).

Figure 9B:
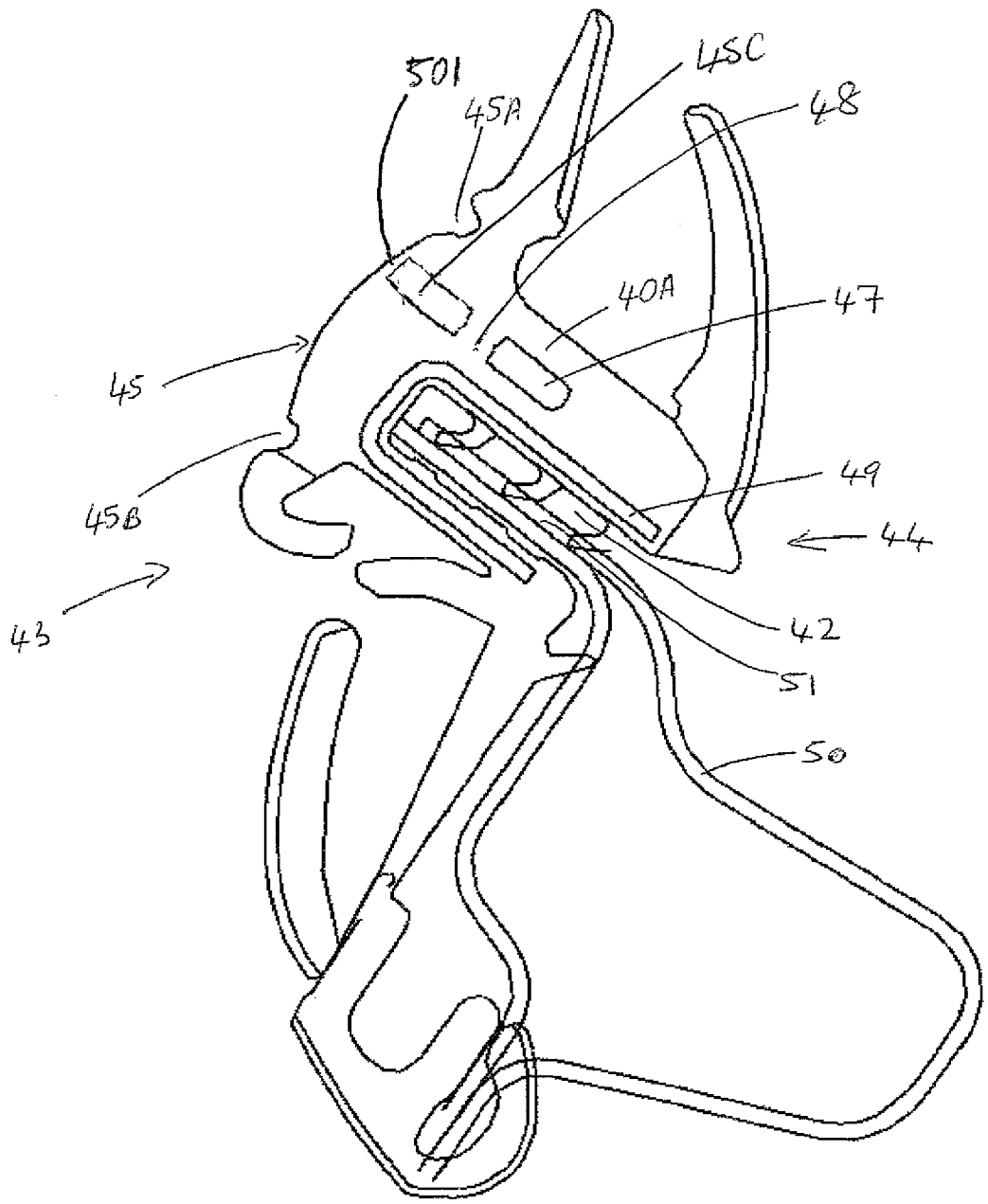
FIG. 9B shows an alternative seal having a outer cover layer or membrane provided between the receiver portion of the seal and the outside surface of the seal.
Figure 9C:
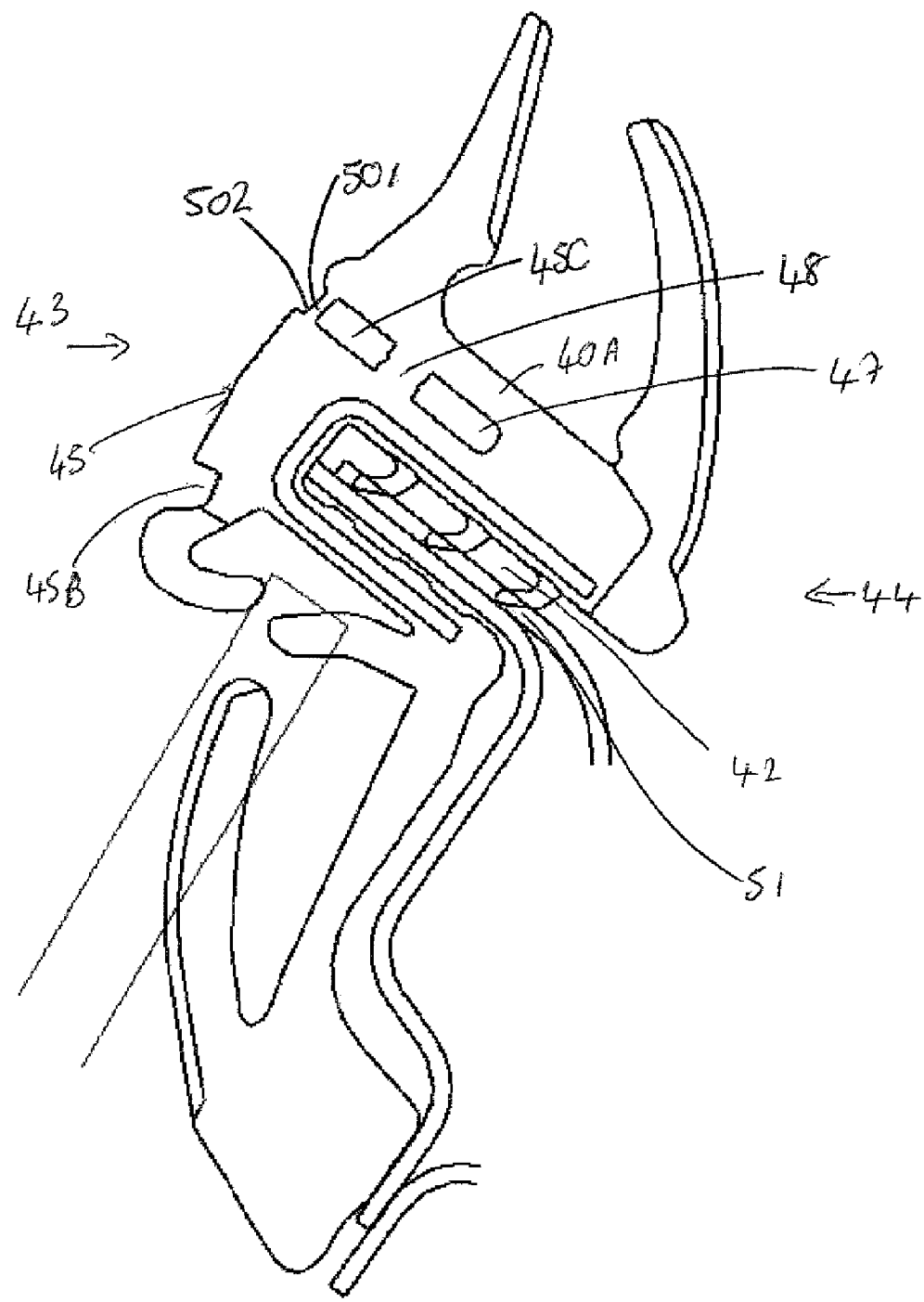
FIG. 9C should an alternative seal having an outer cover layer or membrane layer provided between the receiver portion of the seal and the outside surface of the seal.

Referring to FIGS. 9B and 9C alternative seal arrangements are illustrated in which the seal 40 which of FIG. 9A further comprises a thin outer cover layer or membrane layer 501 arranged between the outer side 43 of the seal the channel 45C and cover portion 48, and receiver 47. The thin outer cover layer or membrane layer 501 is configured to be cut or pierced locally by a retention element as a strip is assembled to the seal. The cover layer 501 is pierced only at those points where a retention element is presented. A marker may be provided on the cover layer 501 to indicate to a user where retention features may be inserted. Any suitable marker may be provided for example a dimple or channel 503 formed on the outside of the cover layer 501, or a line printed at intervals or along the extent of the cover layer. Alternatively the seal could be configured such that the intended location of insertion of the retention elements is along a path defined by the channels 45A or 45B. The cover layer 501 is thin relative to the thickness of the seal body or the cover portion of the seal. The cover layer may have a membrane form for example.

In such an arrangement, the outer side of the seal by virtue of the cover layer 501 presents a good aesthetic finish, the open channel of the seal of FIG. 9A being covered. As such this seal is suitable for use for sealing windows in the context of a vehicle without requiring the use of a fastening strip. However, the seal also comprises all of the features necessary to receive and engage a fastening strip if such a strip is to be retrofitted onto the vehicle. The user thus has the option of selecting a fastening strip 30 with the desired colour or finish for fitting retroactively to the vehicle. Furthermore be enabling user selection of the appropriate fastening strip it is possible to enable a changing of strips throughout the lifetime of the vehicle.

This seal arrangement and the corresponding fastening strip configured for assembly to the strip have the advantages of facilitating the selection of finish. The finish may be the seal on its own or a fastening strip of choice which is engaged with the seal. As noted above, it is also possible for the fastening strip to be removed and replaced as required. This provides increased flexibility for the user.

Figure 10C:
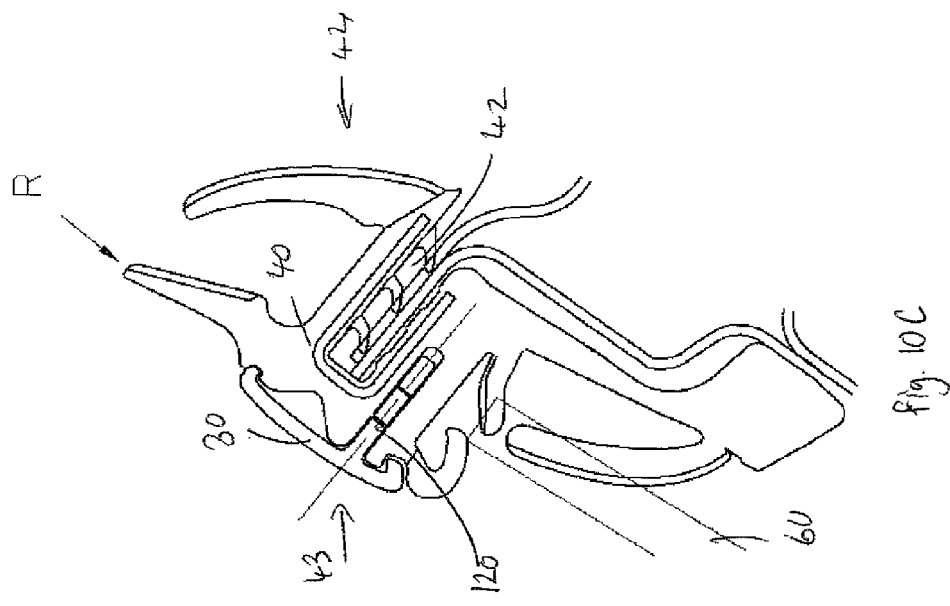
FIGS. 10A, 10B and 10C are cross-sectional views through fastening strips and seals of alternative embodiments of the invention.
Figure 10B:
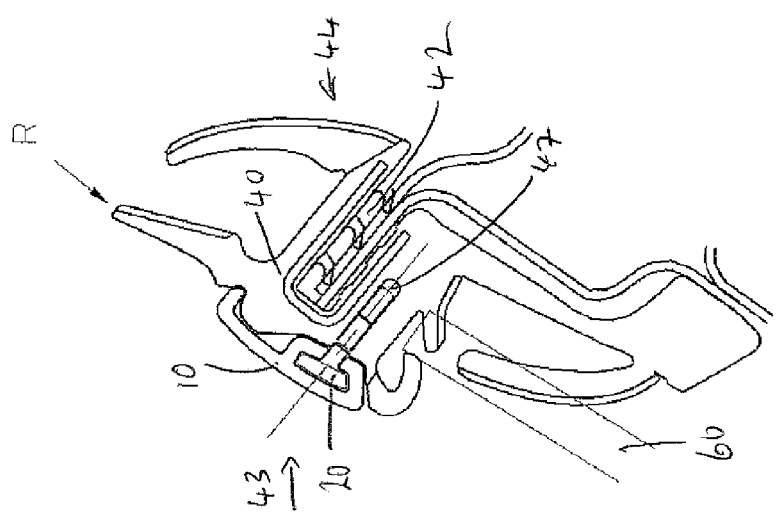
Figure 10A:
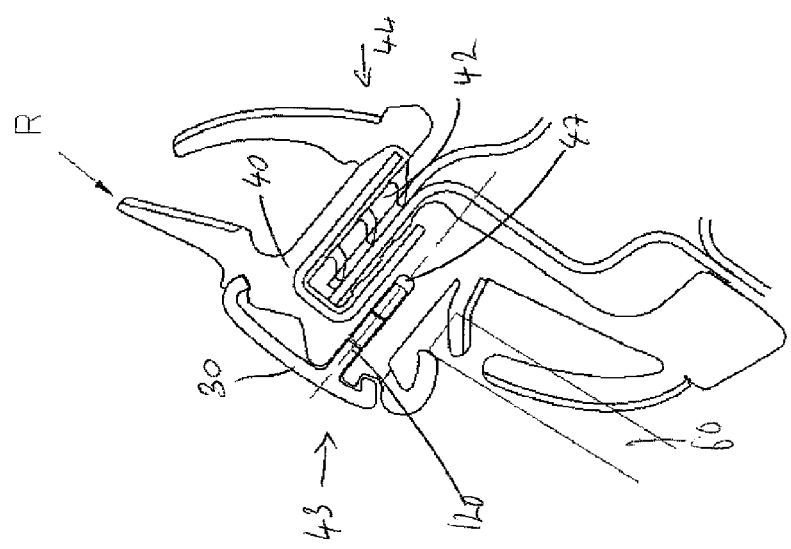

Referring to FIGS. 10A to 10C, alternative arrangements of the seals and fastening strips as described above are shown. Again similar references have been used for previously described integers or elements. The exemplary embodiment of FIG. 10B is similar to that of FIGS. 3A and BB, the exemplary embodiment of FIG. 10B is similar to that of FIGS. 2A and 2B, and the exemplary embodiment of FIG. 10C is similar to that of FIG. 8, which have been described above. In each case the retention feature is located between the vehicle door flange 51 and window 60.

Figure 11A:
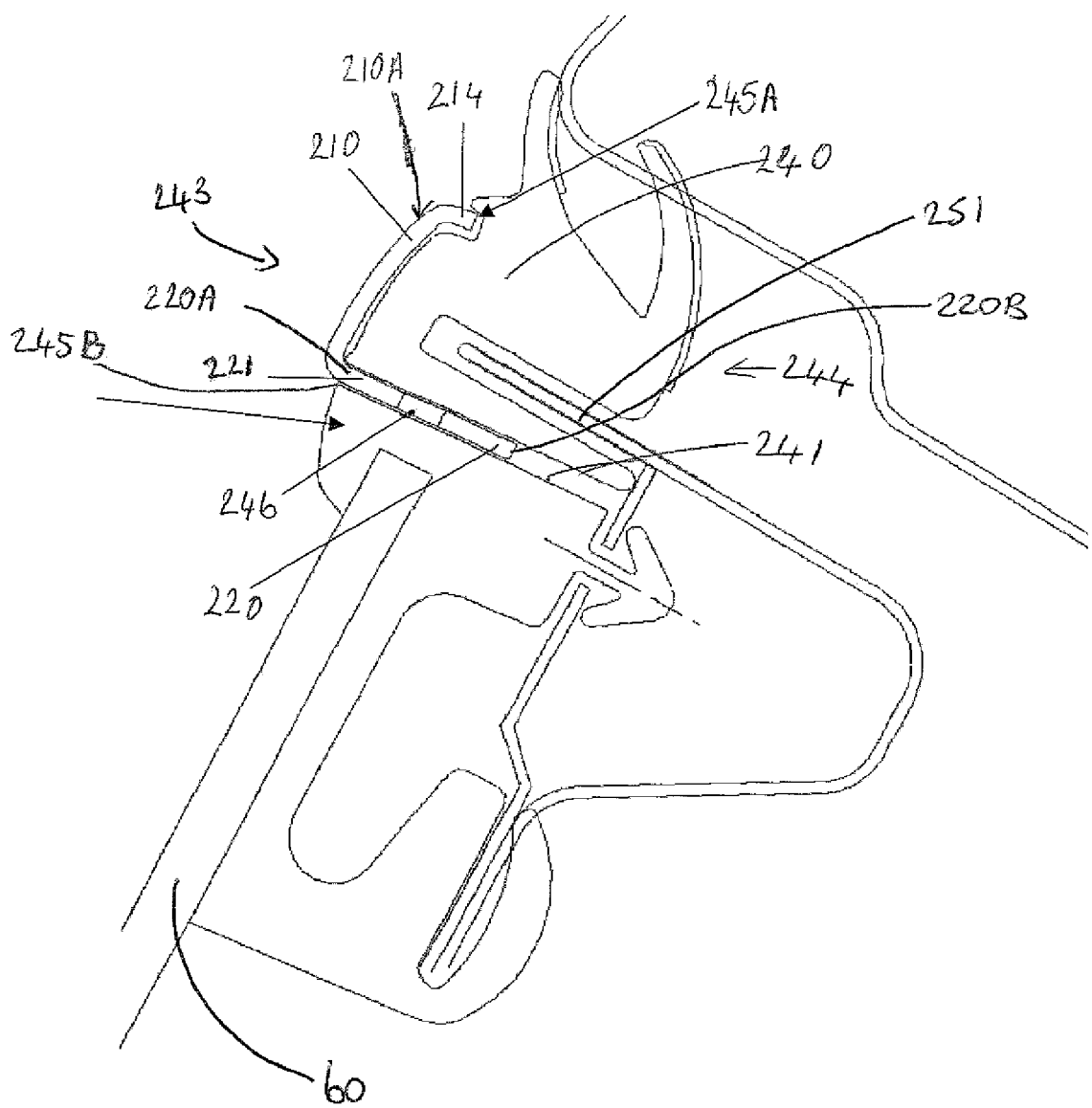
FIG. 11A is a cross-sectional view of a seal and a fastening strip according to an alternative embodiment of the invention, showing a retention feature of the fastening engaging the seal.
Figure 11B:
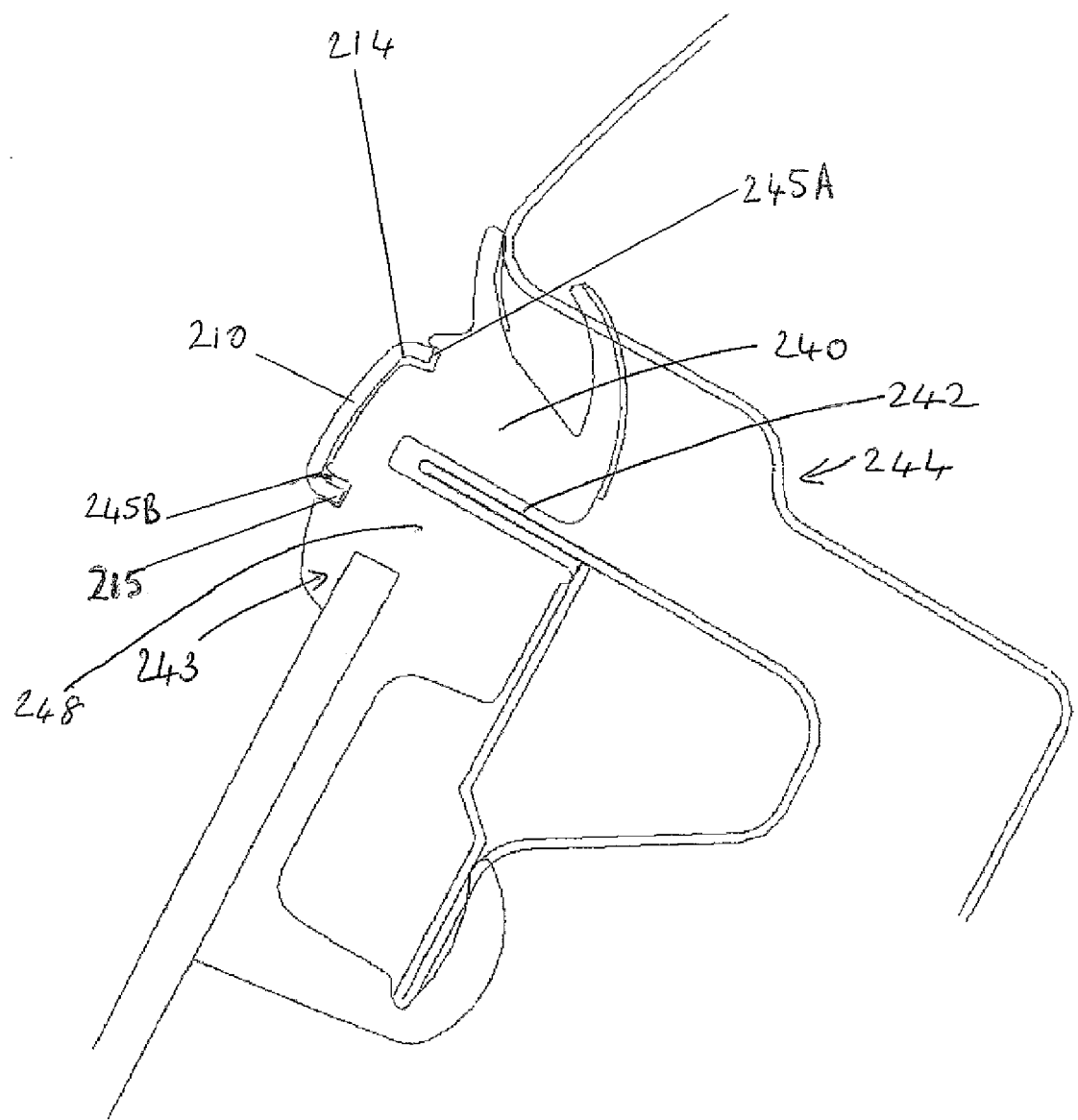
FIG. 11B is a cross-sectional view of a portion of the seal at a point where there is no retention feature.

Referring to FIGS. 11A and 11B a seal and fastening strip according to an alternative embodiment are shown. The seal 240 comprises an outer fastening side 243 which in use is exposed and abuts a fastening strip and an inner seal side 244 which is use faces and/or abuts the vehicle door.

The seal 240 comprises a main seal body 240A, an inner door connection side 244 which in use is arranged to face towards and connect to the door flange, and an outer fastening side 243 which in use faces and abuts the fastening strip 210. The outer fastening side 243 comprises a formation for receiving the fastening strip in this case having channels 245A and 245B formed therein.

The seal 240 comprises a first receiver 242 for receiving the flange 251 of the door and a second receiver for receiving a retention element of the fastening strip. The second receiver may comprise a through hole 241 which is open to the inner side 244 of the seal (FIGS. 11A) or a blind hole (not shown) which is closed to the inner side 244 of the seal. The receiver hole 241 comprises a cover portion 248 which is pierced at intervals to form localised perforations 246 to allow a retention element of the fastening strip 210 to pass through the cover portion 248.

The fastening strip 210 comprises a strip or web form having depending wall members 214 and 215 at the front and back sides thereof. The depending wall members are receivable in the locator channels 245A and 245B. The depending member 215 comprises one or more retention elements 220 located at intervals thereon. FIG. 11A a section view at a point on the longitudinal axis of the strip and seal shows a retention element 220 engaging the seal 240. The seal comprises a perforation 246 in the cover portion 248 thereof for receiving the retention element. FIG. 11B a section view are a different point on the longitudinal axis of the strip and seal, where there is no retention element at shows that at this point the cover portion 248 of the seal is intact, no perforation 246 has been provided at this point. The depending wall members 214 and 215 are shown seated into the locator channels 245A and 245B.

In this example, the retention element 220 is integrally formed with the fastening strip 210. The spacing of the retention elements 220 may be varied as required. The retention element 220 comprises a form and features similar to the retention element 120. The retention element 220 comprises a distal end 220A and a proximal end 220B, a strip engaging portion 221, which is this case is integrally formed with the strip at the front depending wall 214 of the strip, a head portion 223, having a point 224, undercuts or barbs 225 and retention surfaces or shoulder portions 228 and a stem 222. The features of this retention element are similar to the features of the retention element 120 which are described in detail above. The manner of engagement of the retention element 220 with the seal 240 is similar to that described in detail for engagement of the element 120 with the seal 40.

Referring to FIGS. 12 to 17 an encapsulated glass seal 340 and alternative fastening strips 310, 410 are shown. It will be understood that heretofore the arrangement has been described with reference to fixing windows in a vehicle door where the windows are movable in a vertical direction relative to the door. In these encapsulated glass arrangements such vertical movement is not usual in that the glass may be permanently fixed or may be pivotable relative to the vehicle. It will be appreciated therefore that the seal and strip of the present invention is not intended to be limited to any one example of fixing glass in the context of a vehicle.

As before seal 340, for fastening to a window pane 600, has a first outer side 343 which in use is exposed and abuts the fastening strip 310, 410, and a second inner side 344 which in use faces the vehicle.

Figure 12A:
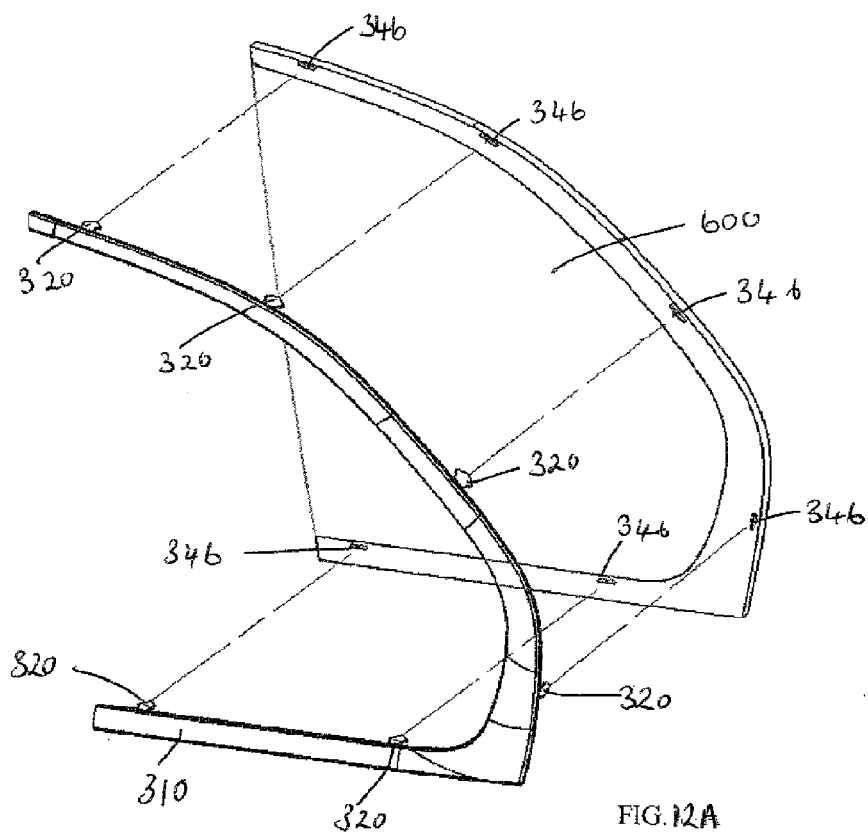
FIGS. 12A and 12B are schematic view of a fastening strip for assembly to a seal in an encapsulated glass window arrangement according to an alternative embodiment of the invention.
Figure 12B:
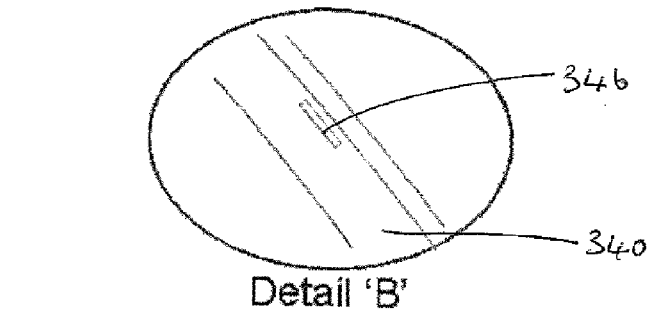
Figure 12B:
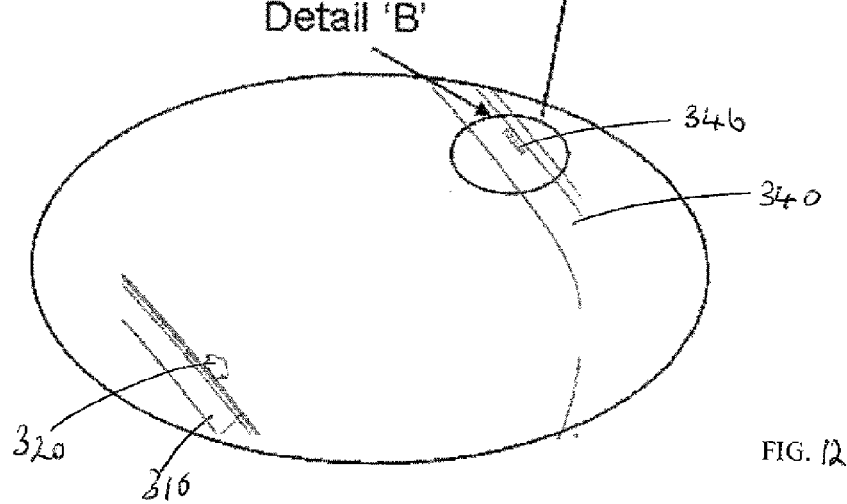

The seal 340 and the fastening strip 310, 410 have corresponding forms, for example as shown FIG. 12 corresponding to the peripheral edge of the window 600 to be sealed. These components are elongate and extend in the longitudinal direction. Retention elements 320 and perforations 346 are provided at corresponding locations along the lengths of the strip and seal.

Figure 13A:
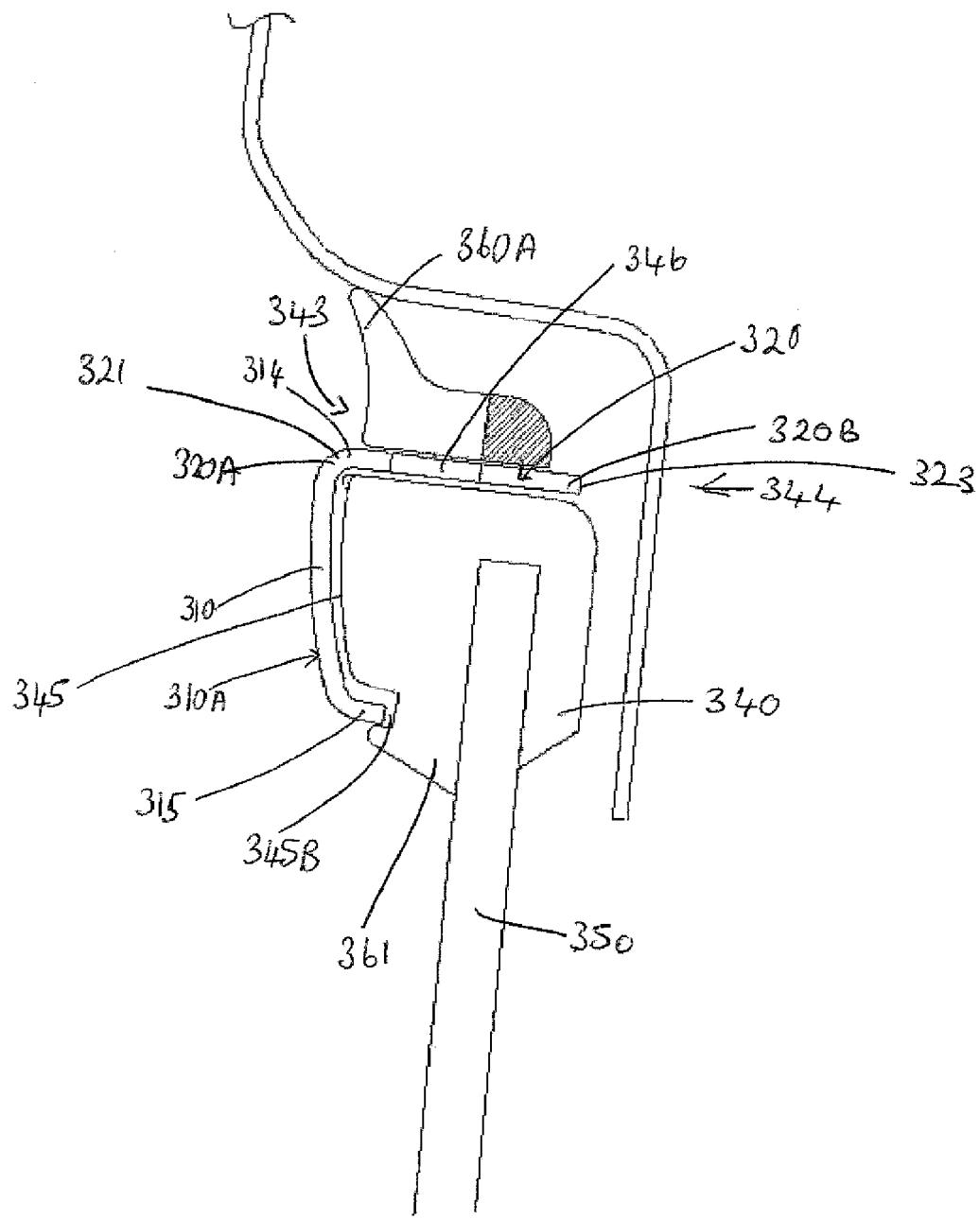
FIGS. 13A and 13B are cross-sectional views of a seal and a fastening strip applied to an encapsulated glass window according to an alternative embodiment of the invention.
Figure 13B:
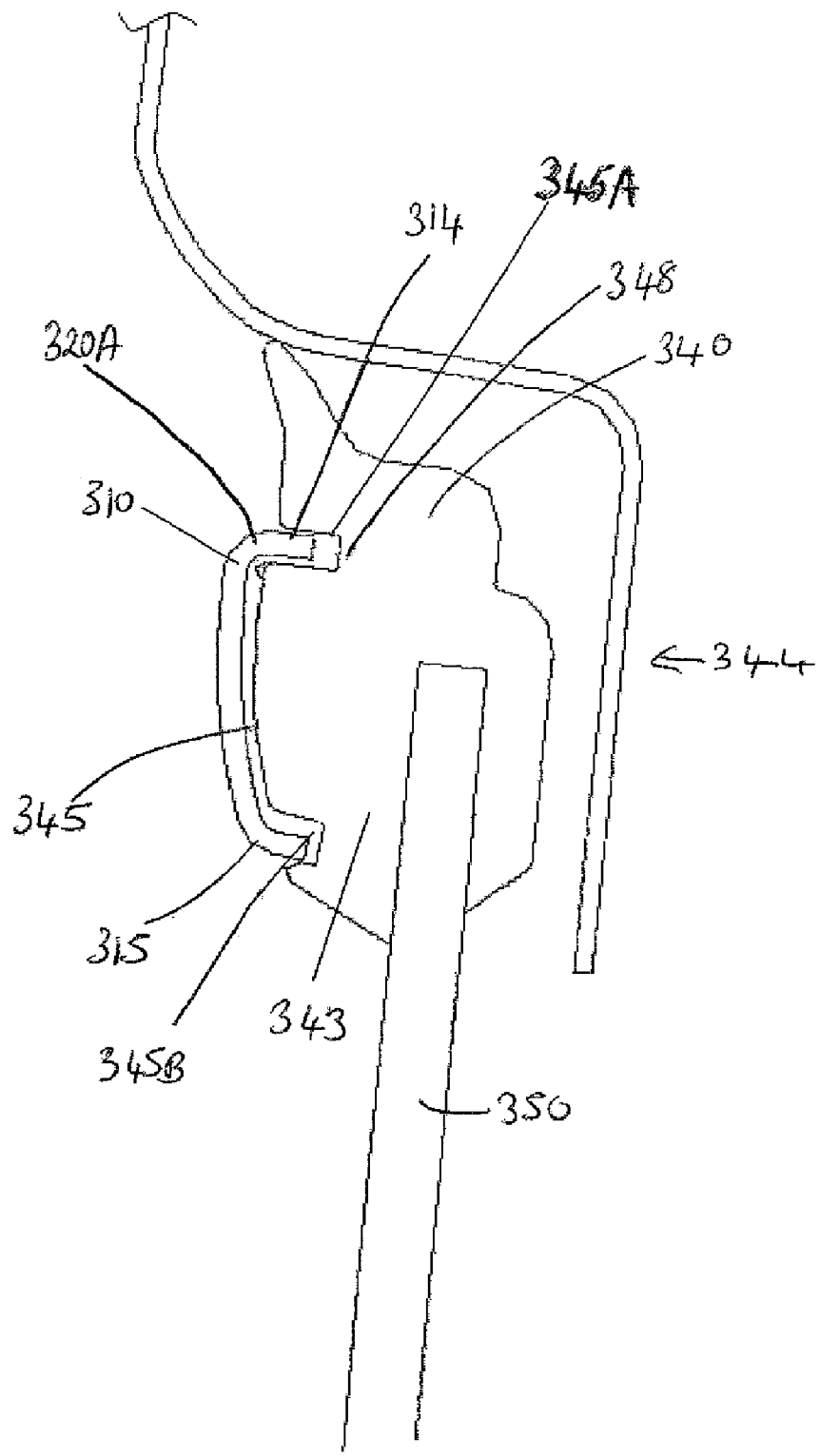
Figure 13C:
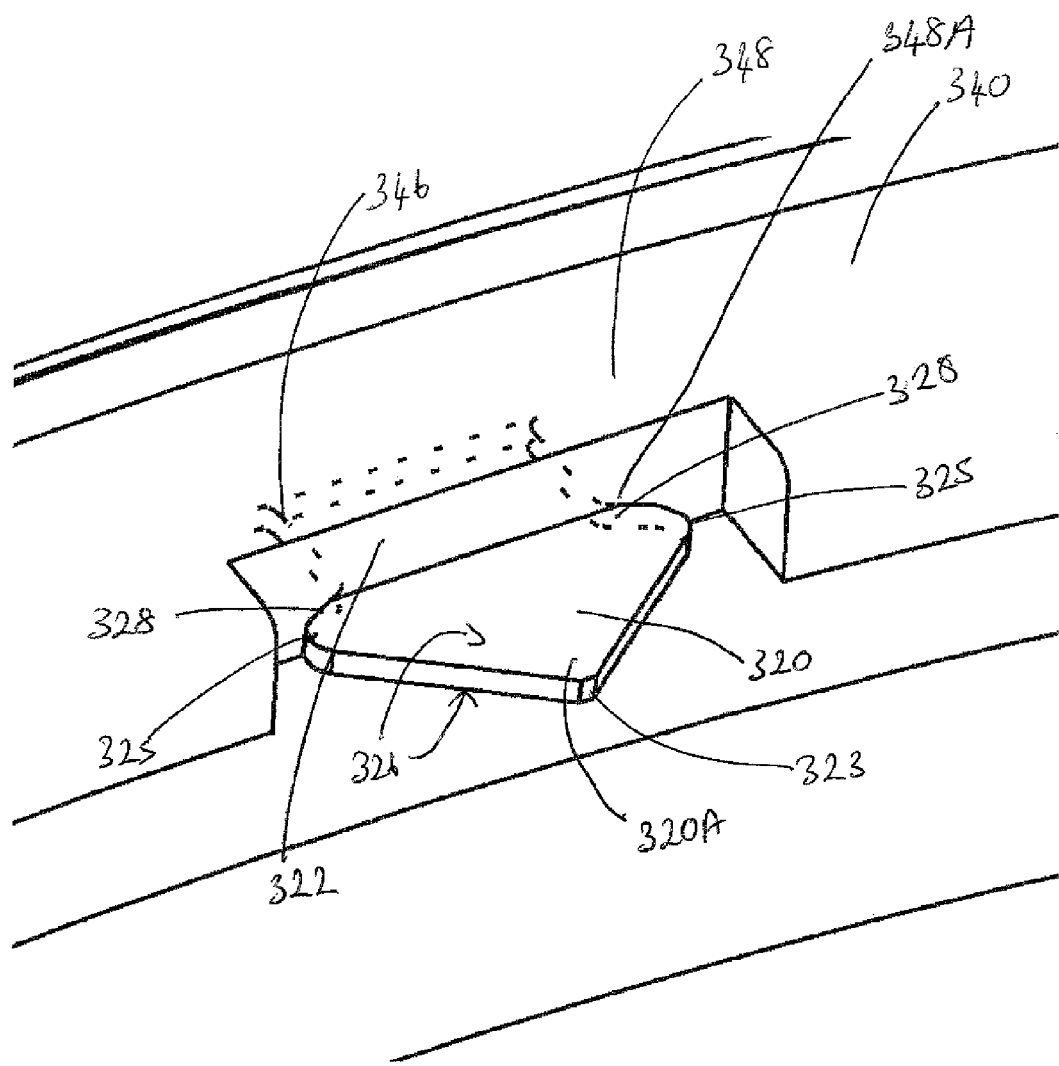
FIG. 13C is a detailed perspective view of a retention feature of FIG. 13A in place in the seal.

Referring to FIG. 13A, 13B and 13C, the seal 340 comprises a first receiver 342 for receiving a portion of the window 600 and a second receiver 341 for receiving a retention element of the fastening strip 310, 410. The outer fastening side 343 comprises recessed channels 345A and 345B for receiving the fastening strip. In use, the fastening strip is seated in these recessed channels formed in the outer side 343 of the seal to assist in location the fastening strip relative to the seal and with the assembly and retention of the fastening strip.

The receiver 341 comprises a cover portion 348 (see FIG. 13B) which is pierced at intervals to form localised perforations 346 (see FIG. 13A) to allow a retention element 320 of the fastening strip 310 to pass through the cover portion 348. As shown in this case, the localised perforations 346 are located in the seal cover portion in the base of the channel 345A.

The fastening strip 310 comprises a web form with front and back depending wall members 314 and 315 which in use extend in the direction of the seal and correspond to the recessed channels 345A and 345B on the outer side 343 of the seal. Retention elements 320 are provided at intervals along the fastening strip. The retention elements 320 are configured to be inserted through perforations 346 provided in the seal.

In this arrangement, the retention elements 320 are integral to the fastening strip. The retention elements 320 have a form and features similar to the retention element 120 described above, and similar reference numbers have been used to describe the features. The retention elements 320 are also engaged with the target seal in a similar manner as described previously with reference to elements 20 and 120. The retention element 320 comprises a proximal end 320A and a distal end 320B, a strip engaging portion 321, which is this case is integrally formed to the strip at the front depending wall 314 of the strip, a head portion 323, having a point 324, undercuts or barbs 325 and retention surfaces or shoulder portions 328 and a stem 322. The features of this retention element are similar to the features of the retention element 120 described in detail above. The manner of engagement of the retention element 320 with the seal 340 is also similar to that described in detail for engagement of the element 120 with the seal 40.

The retention element 320, as shown in the illustrated examples, has a low profile with the depth of the element being less than the width across the front and back faces thereof. The stem portion 322 spaces the head portion 323 apart from the top portion and locates the head portion as required for it to be engaged directly with an engagement surface of the seal.

The barbs 325 are arranged on opposite sides of the head portion and extend generally in the direction of longitudinal (X) axis of the strip.

The pointed form of the head portion 323 assists in assembly of the fastening strip 310 to the seal. In this case sections of the material of the cover portion 348 of the seal is pierced at intervals to form perforations 346 to enable the head portion of the retention element to pass through the material of the seal cover. The perforations 346 and the head portion are dimensioned such that the perforation is smaller than the head portion of the retention element, thus when passed through a perforation the barbs 325 and shoulder portions 328 engage with and are retained against the inner side of cover portion 348 at inner seal engagement surfaces 348A. The length and width or cross-sectional area dimensions of the stem portion 322 are configured in view of the material properties of the seal cover portion, the depth of the seal, and the required location of the retention element relative to the seal and in particular the barbs 325 and retention surfaces 328 relative to the seal on assembly. There must be a sufficient mass of the seal behind the retention surfaces 328 so that the seal is effective in maintaining a positive contact with the retention element and so that the seal does not flex during normal use. The head portion of the retention element provides expansion of the seal to receive the wide base portion and the seal then contracts around the stem 322 and in so doing the inner side of the cover portion adjacent the perforation i.e. the engagement surfaces 348A engage with the shoulder portions 328 of the retention element.

Referring to FIG. 13C, the retention element is shown assembled to the seal 340, the engagement surfaces 348A adjacent the perforation 346 being engaged with the retention surfaces 328A of the element.

Figure 14A:
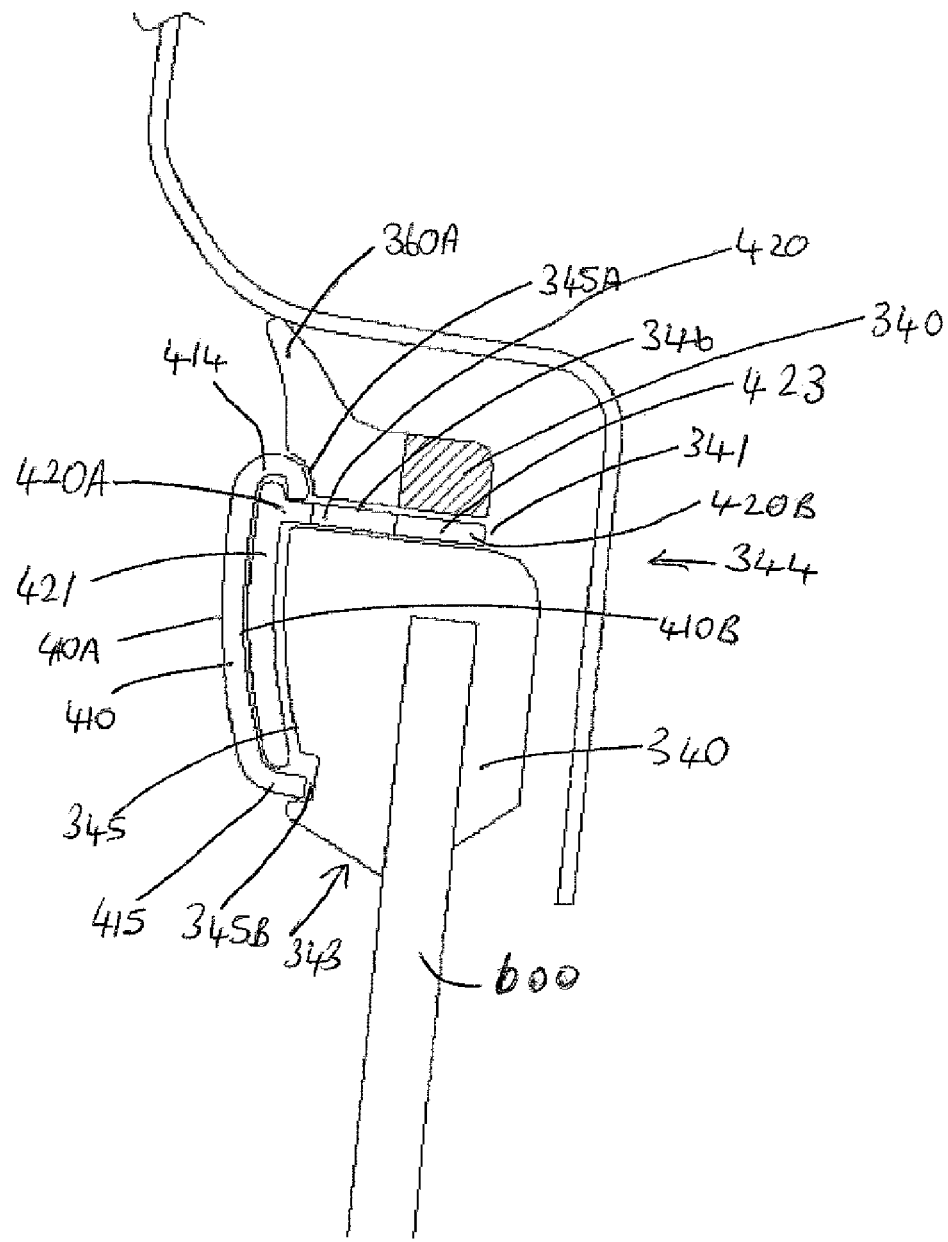
FIGS. 14A and 14B are cross-sectional views of a seal and a fastening strip applied to an encapsulated glass window according to an alternative embodiment of the invention.
Figure 14B:
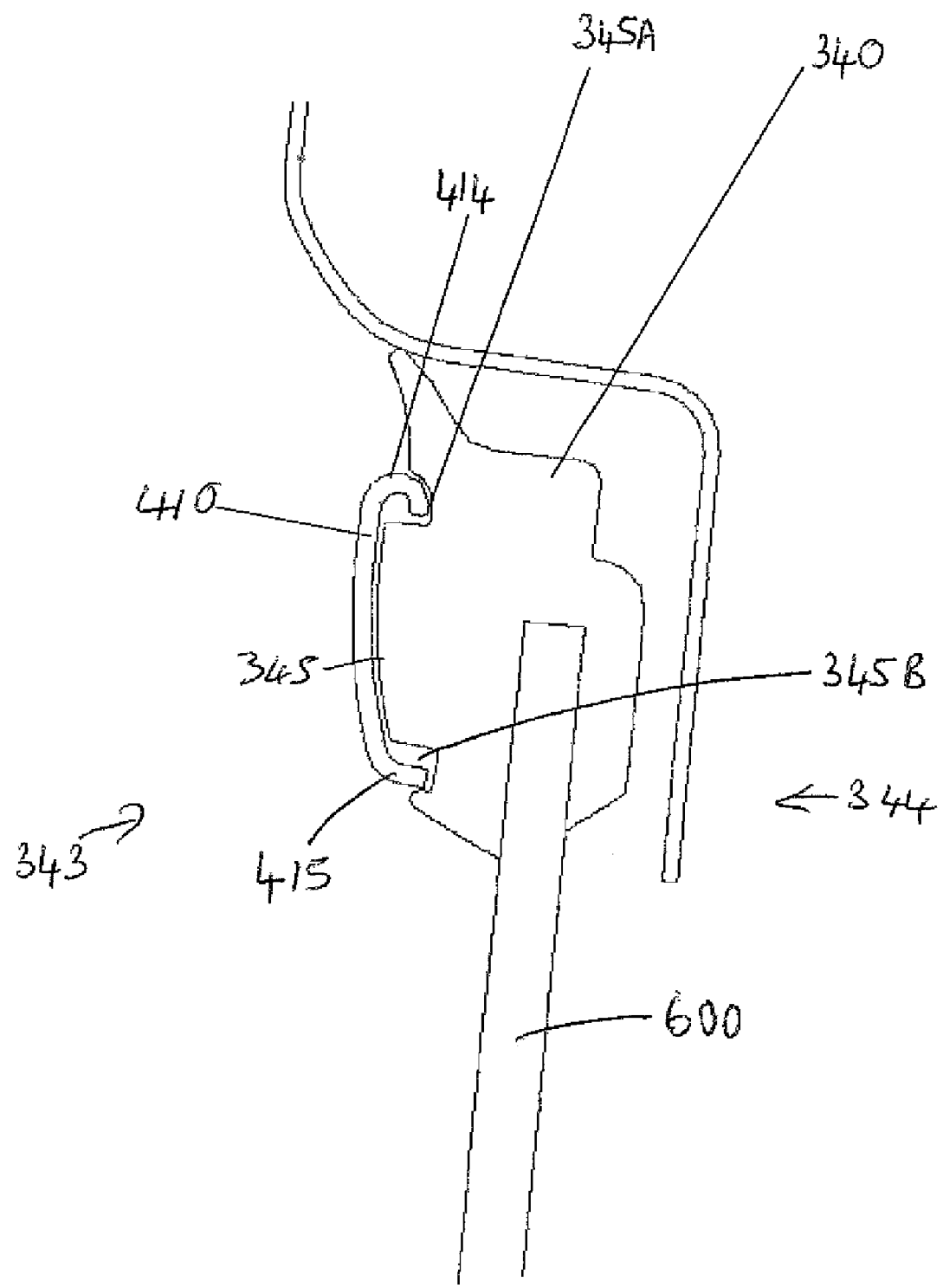
Figure 15:
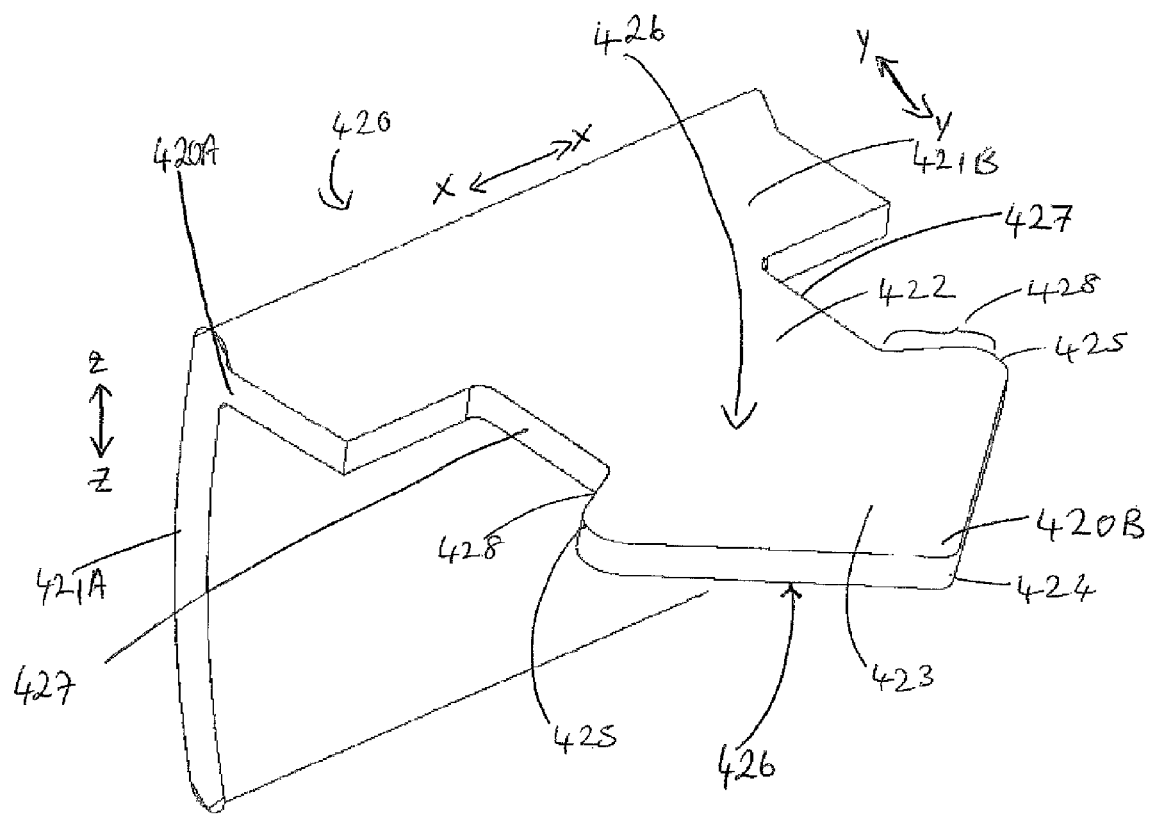
FIG. 15 is a detailed perspective view of the retention features of FIG. 14A.

Referring to FIGS. 14A, 14B and 15 a fastening strip 410 is provided for fixing to the seal 340. The fastening strip 410 has a web form and has front and back depending wall members 414 and 415 which in use extend in the direction of the seal and are received in recessed channels 345A and 345B in the seal. The fastening strip comprises one or more retention elements 420 provided at spaced apart intervals. The retention element 420 is in this case formed as a separate component for assembly to the fastening strip 340, and may be retained in the strip 410 for example, by a suitable mechanical means or by means of gluing, adhesive, or by design of the retention element. The retention element 420 is arranged to pass through a perforation 346 provided in the fastening strip 340.

The features of this retention element 420 other than the specific form of the top portion are similar to the features of the retention element 20 described in detail above. The manner of engagement of the retention element 420 with the seal 340 is similar to that described in detail for engagement of the element 20 with the seal 40.

The retention element 420 comprises a proximal end 420A, and a distal end 420B, top strip engaging portion 421, a stem portion 422 and a head portion 423. The head portion 423 comprises a v-shaped or arrow type form having a point 424 and barbs or undercuts 425 and shoulder portions or retention surfaces 428. The retention element 420 comprises front and back surfaces 426 each having a generally flat or planar form. These generally planar surfaces extend from the proximal end to the distal end. The element further comprises non-planar surfaces 427 having the retention surfaces defined therein. The front and back surfaces are in this exemplary embodiment oriented in use parallel to the longitudinal axis of the strip. Similarly in this exemplary embodiment the opposed barbs extend in the direction of the longitudinal axis of the strip.

The form of strip engaging portion 421 conforms to that of the inner surface 410B of the strip 410, and it is retained between the strip and the seal by virtue of the corresponding form. The engagement element is assembled to the strip by a snap-in function or adhesive or by other suitable means The retention element in this case, as shown in the illustrated examples, has a low profile with the depth of the element being less than the width across the front and back faces thereof. The stem portion 422 spaces the head portion 423 apart from the top portion. The barbs 425 are arranged on opposite sides of the head portion 423 and when assembled the opposed barbs extend generally in the direction of the longitudinal axes of the seal and strip. The barbs 425 are undercut back to the stem portion 422 defining shoulder portions or retention surfaces 428.

The retention element is assembled to the seal by passing the head portion thereof through a perforation 346 in the seal. When assembled the barbs or undercuts 425 and the shoulder portions 428 thereof are retained against the inside of the cover portion 348 of the seal, the perforations being smaller than the head portion of the retention element. The form of the retention element is similar to that of the elements 20 or 120 and as described above it also acts in a similar way, providing expansion of the seal to receive the head portion 423 and the seal contracting again around the narrower stem portion.

While in the embodiments described, the faces of head portion of the retention element have a substantially flat form or a low depth form, it will be appreciated that the arrow head may have suitable alternative forms. For example, the retention element may have a form similar to a rivet having a domed or mushroom shaped head form, in which case the stem may have a generally cylindrical form and the features of the head may extend circumferentially about a central axis. The distal end of the retention element may be pointed or comprise other formations or features to assist in expanding or cutting or piercing a cover portion of the seal or the seal directly to enable insertion of the element into the seal. As described above the retention element is sufficiently rigid to interact with the seal as required.

It will be appreciated that what has been described herein are exemplary arrangements of a seal and fastening strip which inter-engage with one another. The features of the seal and fastening strip of each embodiment are similar. The seal and associated fastening strip arrangements according to the invention have a number of advantages. Examples of these advantages follow but it will be understood that this list is provided as a non-limiting list.

One advantage is ease of assembly and avoidance of utilisation of steel clips attached directly to for example, the vehicle door frame. Furthermore the components are assembled to provide an improved finish, and improved efficiency together with material and weight savings.

In addition such an arrangement potentially allows for OEM black/bright versions to be provided which will enable user self customisation of the finish. Such an arrangement was described with reference to FIGS. 9B and 9C. An advantage of the arrangement of FIG. 9B and 9C is that the seal comprises an integral decorative finish as defined by the seal surface 45. In this case the channel 45C for receiving the fastening strip is closed to the outer seal side by a thin cover layer 501. Thus the vehicle may be sold fitted with the seal and having a black seal finish, there is no channel in the seal, the seal therefore has a good aesthetic finish and any water ingress is prevented. The end user may subsequently select a trim or fastening strip that they wish to assemble to the seal. The trim or fastening strip having one or more depending retention elements. The seal may comprise a marker provided at intervals along the length of the seal cover layer to indicate where the retention elements of the fastening strip should be inserted. The markers may comprise for example, a dimple formed on the outer surface of the covering membrane or a line or spot printed onto the membrane. The user presents the retention element to the correct location on the seal and applies a force to first of all pierce the covering membrane, as the retention element is moved further into the seal, the head end passes through the seal cover portion and into the receiver, the retention surfaces being retained in place against the inner engagement surfaces of the seal. If the cover portion does not comprise any perforations then as described above the head of the retention element will pierce the cover portion directly.

In an alternative embodiment the seal may comprise a solid continuous seal with no receiver channel in which case, the retention element is engaged directly in the seal body.

The provision of a seal having a cover portion provided over the blind hole or through hole receiver has the advantages of providing an improved seal. In use, the cover acts as an extra sealing layer. This arrangement provides a good sealing performance and prevents water ingress. In the arrangement in which the receiver comprises a blind hole the seal is continuous and fully intact to prevent water ingress.

The arrangement of the invention advantageously provides a fixing means and method that act longitudinally and laterally.

There are advantages from the point of view of manufacturing the components of the seal and fastening strip. The seal comprises a receiver for receiving a retention element. In comparison with the prior art, it is not necessary to provide a receiver having particular features or formations corresponding to retention features of the fastening strip to enable fastening of the parts. Manufacture and assembly are thus simplified. For example, it is known in the prior art to provide a receiver having formations corresponding to formations on fastening strip to provide inter-engagement of the respective corresponding components. In contrast to seal and fastening arrangements of the prior art, the walls of the receivers of the seal of the invention do not include particular or dedicated formations or locators corresponding to formations of the retention element of the fastening strip. Here the retention function is achieved by the engagement of retention surfaces of the retention element with corresponding deformable surfaces of the seal.

The invention by obviating the need for corresponding formations on the seal receiver and fastening strip retention feature, further provides increased ease of assembly since it is not necessary to align corresponding formations. The problems of tolerance in location of corresponding formations is also overcome.

The strip and seal device according to the various embodiments of the invention have the advantages of being able to copy with tolerances for example in corresponding parts of the strip and the retention element, where these components are manufactured separately for assembly, and in corresponding components of the seal and retention element which are configured to be assembled to each other. This ability to cope with tolerances improves the efficiency of the assembly processes with corresponding reduction in costs and in waste materials.

The invention provides for interengagement of a retention surfaces of a retention element directly be interaction of that surface with an engagement surface of a seal. Effectively engagement is by interference based on how the seal deforms to accommodate and engage the retention element.

In the above various arrangements of the seal, including seals having blind hole, through hole receivers, a solid cover portion, a perforated cover portion, cover layers and a solid seal without a receiver have been described. Furthermore various arrangements of the fastening strip and retention features have been described for example fastening strip having separate retention features, or integral retentions it will be appreciated that combinations of the various alternative seal arrangements and fastening strip arrangements of the exemplary embodiments may be used in different embodiments without departing from the scope of the invention.

While in the embodiments described protrusions are provided on the retention element for engagement with cavities or receivers in a seal, it will be appreciated that the cavities or receivers could alternatively be provide on the retention elements for engagement with protrusions on the seal.

In one case the retention element is manufactured separately from the strip for assembly thereto, this arrangement has the advantages of ease of manufacture and flexibility. There is flexibility in where retention elements are located. Location can be varied with ease depending on assembly requirements and the form of the vehicle door/window to which the seal is to be assembled. Thus a seal and fastening strip of the invention are suitable for assembly with a variety of different vehicle window/door flange arrangements.

The low profile and the pointed form of the retention element are advantageous from an assembly point of view. The retention element is arranged parallel to the longitudinal axes of the fastening strip, seal and door flange.

The words comprises/comprising when used in this specification are to specify the presence of stated features, integers, steps or components but does not preclude the presence or addition of one or more other features, integers, steps, components or groups thereof.

The invention claimed is:

1. A sealing arrangement including a fastening strip and a seal for sealing a window in a vehicle, the fastening strip comprising one or more retention elements, the seal having a sealing body and a first outer fastening side which in use abuts the fastening strip and a second inner sealing side which in use faces a portion of the vehicle; and wherein the seal comprises an inner engagement surface for engaging with the one or more retention elements of the fastening strip,
   wherein each retention element comprises a head portion, the head portion being shaped for ease of insertion into the seal and having one or more retention surfaces for engagement with the inner engagement surface of the seal,
   wherein the seal is deformable being configured to deform to receive each retention element as it is inserted therethrough under force, and, to contract such that the inner engagement surface thereof positively engages with the one or more retention surfaces when each retention element is assembled thereto, the seal comprising a receiver for receiving the one or more retention elements and a cover portion provided between the receiver and the outer fastening side, and
   wherein the cover portion of the seal comprises one or more thinned recesses preformed therein and being configured to enable the head portion of each retention element to be inserted through a respective thinned recess and into the receiver such that the thinned recess is cut or pierced to form one or more perforations, wherein the perforations are spaced apart along the longitudinal axis of the seal, and the one or more perforations are dimensioned to be smaller than the head portion of each retention element, wherein the engagement surface of the seal is the inner surface of the seal adjacent the perforation,
      the head portion of each retention element being configured to provide for expansion of the one or more perforations of the seal to enable insertion of each retention element into the receiver, the head portion being further configured to cut or pierce the seal at each thinned recess to enable insertion of each retention element into the receiver.

2. The sealing arrangement as claimed in claim 1, each retention element having a fastening strip proximal end and a fastening strip distal end which in use is inserted into the seal, wherein each retention element comprises at least two substantially planar surfaces which extend between the proximal and distal ends thereof.

3. The sealing arrangement as claimed in claim 2, each retention element further comprising at least one non-planar surface extending between the proximal and distal ends thereof, that surface comprising the one or more retention surfaces for engagement with the seal.

4. The sealing arrangement as claimed in claim 3 wherein the one or more retention surfaces are defined by projections or barbs which are offset relative to the planar surfaces.

5. The sealing arrangement as claimed in claim 1 wherein the one or more retention surfaces are defined by projections or barbs.

6. The sealing arrangement as claimed in claim 1 wherein the one or more retention surfaces are defined by recesses or indents.

7. The sealing arrangement as claimed in claim 1 wherein the head portion comprises a pointed or tapered form.

8. The sealing arrangement as claimed in claim 1 wherein each retention element comprises a stem configured to space and locate the one or more retention surfaces on assembly for engagement with the seal.

9. The sealing arrangement as claimed in claim 8 wherein the stem portion of each retention element has a length dimensioned to locate the head portion as required, to achieve a secure engagement, in the receiver when the strip is assembled to the seal.

10. The sealing arrangement as claimed in claim 8 wherein the seal is configured to expand to receive the head portion and to contract around the stem portion.

11. The sealing arrangement as claimed in claim 1 wherein each retention element comprises a substantially arrow shaped head portion the head portion tapering outwardly to the barbs from a point.

12. The sealing arrangement as claimed in claim 11 wherein the barbs are undercut to the stem to define the one or more retention surfaces.

13. The sealing arrangement as claimed in claim 1 each retention element comprising front and back substantially planar surfaces, the front and back surfaces being oriented to run substantially parallel to the fastening strip in use.

14. The sealing arrangement as claimed in claim 1 wherein the outer fastening side of the seal comprises one or more locator formations, recesses or channels for locating or receiving corresponding locator formations on the inner side of the fastening strip.

15. The sealing arrangement as claimed in claim 1 wherein the outer strip side of the seal comprises one or more formations, recesses or channels for locating or receiving the one or more retention elements provided on the inner side of the strip.

16. A sealing arrangement as claimed in claim 1, wherein the seal comprises a thin cover layer provided between the outer fastening side and the inner sealing side thereof, the thin cover layer being arranged to cover perforations, wherein the thin cover layer is configured to be pierced or cut by the one or more retention elements as the one or more retention elements are presented to the seal.

17. A sealing arrangement as claimed in claim 16 wherein the thin cover layer comprises a membrane.

18. The sealing arrangement as claimed in claim 1 wherein the seal and the fastening strip are elongate members which in an assembled configuration have substantially parallel longitudinal axes and wherein the one or more retention elements are engaged in the seal in a direction substantially at right angles to said longitudinal axes.

19. The sealing arrangement as claimed in claim 1 the fastening strip comprising a plurality of retention elements located at spaced apart at intervals along the longitudinal axis of the fastening strip.

20. The sealing arrangement as claimed in claim 19 wherein the plurality of retention elements are formed separately from the fastening strip and wherein the plurality of retention elements are configured for assembly to the fastening strip.

21. The sealing arrangement as claimed in claim 1 wherein each retention element is formed integral to the fastening strip.

22. The sealing arrangement as claimed in claim 1 wherein the receiver comprises a blind hole closed to the inner sealing side of the seal.

23. The sealing arrangement as claimed in claim 1 wherein the receiver comprises a through hole open to the inner sealing side of the seal.

24. The sealing arrangement as claimed in claim 1 wherein the receiver is formed as a cavity or channel extruded in the seal.

25. The sealing arrangement as claimed in claim 1 wherein the cover portion comprises a continuous form.

26. The sealing arrangement as claimed in claim 1 wherein the head portion of each retention element is sufficiently robust to provide an expansion or cutting of the seal without flexing of the head portion.

* * * * *